US012258452B2

(12) United States Patent
Kaufmann et al.

(10) Patent No.: US 12,258,452 B2
(45) Date of Patent: Mar. 25, 2025

(54) METHOD FOR COMPLETE RECYCLING OF INORGANIC-FIBER REINFORCED EPOXY COMPOSITES WITH BORON HALIDES

(71) Applicants: Technische Universität Clausthal, Clausthal-Zellerfeld (DE); MPM Environment Intelligence GmbH, Bad Grund (DE)

(72) Inventors: Dieter Eckhard Kaufmann, Clausthal-Zellerfeld (DE); Viktor Zapolskii, Clausthal-Zellerfeld (DE); Peter Kolbe, Bad Grund (DE); Gerd Uhde, Bad Grund (DE)

(73) Assignees: Technische Universität Clausthal, Clausthal-Zellerfeld (DE); MPM Environment Intelligence GmbH, Bad Grund (DE)

( * ) Notice: Subject to any disclaimer, the term of this patent is extended or adjusted under 35 U.S.C. 154(b) by 863 days.

(21) Appl. No.: 17/438,991

(22) PCT Filed: Feb. 27, 2020

(86) PCT No.: PCT/EP2020/055166
§ 371 (c)(1),
(2) Date: Sep. 14, 2021

(87) PCT Pub. No.: WO2020/182484
PCT Pub. Date: Sep. 17, 2020

(65) Prior Publication Data
US 2022/0153954 A1 May 19, 2022

(30) Foreign Application Priority Data

Mar. 14, 2019 (DE) .......................... 102019106524.0

(51) Int. Cl.
*C08J 11/16* (2006.01)
*B29B 17/02* (2006.01)

(52) U.S. Cl.
CPC .......... *C08J 11/16* (2013.01); *B29B 17/0206* (2013.01); *C08J 2363/02* (2013.01)

(58) Field of Classification Search
CPC .... C08J 11/16; C08J 2363/02; C08J 2363/00; B29B 17/0206; Y02W 30/62
See application file for complete search history.

(56) References Cited

U.S. PATENT DOCUMENTS

| | | | |
|---|---|---|---|
| 8,920,932 B2 | 12/2014 | Adam | |
| 2014/0066576 A1* | 3/2014 | Anderson | C08J 5/06 525/437 |
| 2014/0221510 A1 | 8/2014 | Liang et al. | |
| 2016/0289412 A1* | 10/2016 | Qin | C08J 11/24 |
| 2018/0355142 A1* | 12/2018 | Zhang | C08J 11/26 |
| 2020/0094443 A1 | 3/2020 | Schafer et al. | |

FOREIGN PATENT DOCUMENTS

| | | | | |
|---|---|---|---|---|
| CN | 104672488 A | * | 6/2015 | ............ C08L 63/00 |
| CN | 107365429 A | * | 11/2017 | ............ C08J 11/16 |
| CN | 108368280 A | * | 8/2018 | .......... B01J 31/0244 |
| EP | 3385314 A1 | * | 10/2018 | .......... B01J 31/0244 |
| WO | 2017106243 A1 | | 6/2017 | |
| WO | 2017175100 A1 | | 10/2017 | |
| WO | 2018206788 A1 | | 11/2018 | |

OTHER PUBLICATIONS

Xiao et al, ACS Sustainable Chemistry and Engineering Recycling of Epoxy Thermoset and Composites vis Good Solvent Assisted and Small Molecules Participated Exchange Reactions. (Year: 2018).*
M. Motavalli; C. Czaderski; A. Schumacher; D. Gsell. Textiles, Polymers and Composites for Buildings. 4 Fibre Reinforced Polymer Composite Materials for Building and Construction. Woodhead Publishing Series in Textiles, 2010, 69-128.
C. E. Bakis; Lawrence C. Bank; V. L. Brown, M .; E. Cosenza; J. F. Davalos; J. J. Lesko; A. Machida; S. H. Rizkalla; and T. C. Triantafillou. Fiber-Reinforced Polymer Composites for Construction, J. Composites for Construction, 2002, 6(2), doi.org/10.1061/(ASCE)1090-0268(2002)6:2(73).
Liang, B.; Qin, B.; Pastine, S.; Li, X. Reinforced Composite and Method for Recycling the Same, US 20140221510 A1, 2014.
Adam, G. A. Recycling Carbon Fibers from Epoxy Using Solvent Cracking. U.S. Pat. No. 8,920,932, 2014.
Asmatulu, E.; Twomey, J.; Overcash, M. Recycling of Fiber-Reinforced Composites and Direct Structural Composite Recycling Concept. J. Composite Materials, 2014, 48 (5), 593-608.
Taynton P.; Ni H.; Zhu C.; Loob S.; Jin Y.; Zhang W.; Qi H. J. Repairable Woven Carbon Fiber Composites with Full Recyclability Enabled by Malleable Polyimine Networks. Advanced materials (Deerfield Beach, Fla.), 2016, 28(15), 2904-9.
Kaneko, M.; Usami, K.; Ishimoto, T. Prepregs and Fiber-Reinforced Composites Therefrom. Jpn. Kokai Tokkyo Koho, 2010, JP2010241845.
Y. Wang, X. Cui, H. Ge, Y. Yang, Y. Wang, C. Zhang, J. Li, T. Deng, Z. Qin, X. Hou. Chemical Recycling of Carbon Fiber Reinforced Epoxy Resin Composites via Selective Cleavage of the Carbon-Nitrogen Bond. ACS Sustainable Chem. Eng. 2015, 3, 3332-3337.
M. Das, R. Chacko, S. Varughese. An Efficient Method of Recycling of CFRP Waste Using Peracetic Acid. ACS Sustainable Chem. Eng. 2018, 6(2), 1564-1571, DOI: 10.1021/acssuschemeng.7b01456.
K. Yu, Q. Shi , M. L. Dunn , T. Wang , H. J. Qi. Carbon Fiber Reinforced Thermoset Composite with Near 100% Recyclability. Adv. Funct. Mater. 2016, 26, 6098-6106.
W. Guo, S. Bai, Y. Ye and L. Zhu. Recycling carbon fiber-reinforced polymers by pyrolysis and reused to prepare short-cut fiber C/C composite. Journal of Reinforced Plastics & Composites. 2019 0(0) 1-9.

(Continued)

*Primary Examiner* — Katarzyna I Kolb
(74) *Attorney, Agent, or Firm* — Renner, Otto, Boisselle & Sklar, LLP

(57) ABSTRACT

The present invention is related to a method for recycling a composite material comprising inorganic fibers and an epoxy-resin in a one pot reaction, wherein the method comprises reacting the composite material with a boron halide in a solvent.

8 Claims, 23 Drawing Sheets

(56) References Cited

OTHER PUBLICATIONS

Figure 1:
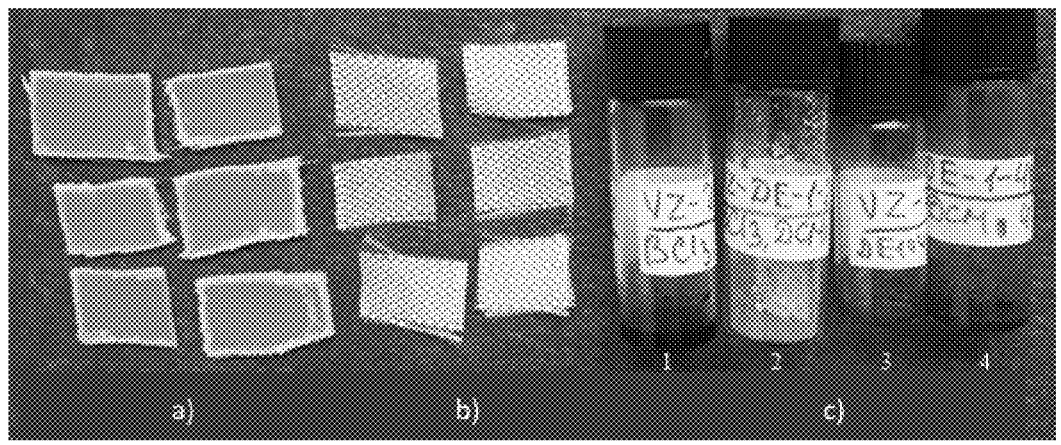

K. Kim, J. Jeong, K. An, B. Kim. A Low Energy Recycling Technique of Carbon Fibers-Reinforced Epoxy Matrix Composites. Ind. Eng. Chem. Res. 2019, 58, 618-624.

M. Limburg, J. Stockschläder, P. Quicker. Thermal treatment of carbon fiber reinforced polymers (Part 1: (Recycling). Waste Management & Research 2019, vol. 37(1) Supplement 73-82.

Y. Liu, M. Farnsworth, A. Tiwari. A review of optimisation techniques used in the composite recycling area: State-of-the-art and steps towards a research agenda. Journal of Cleaner Production 140 (2017) 1775-1781.

M. Overcash, J. Twomey, E. Asmatulu, E. Vozzola, E. Griffing. Thermoset composite recycling—Driving forces, development, and evolution of new opportunities. Journal of Composite Materials. 2018, vol. 52 (8) 1033-1043.

J. Wellekötter, S. Baz, J. Schwingel, G. Gresser, P. Middendorf, C. Bonten. Recycling of composites—A new approach minimizes downgrading. AIP Conference Proceedings 2055, 060009 (2019).

K. Pender and L. Yang. Investigation of Catalyzed Thermal Recycling for Glass Fiber-Reinforced Epoxy Using Fluidized Bed Process. Polymer Composites 2019 1-10.

P. Döhlert, J. Pfrommer, S. Enthaler. Recycling Concept for End-of-Life Silicones: Boron Trifluoride Diethyl Etherate as Depolymerization Reagent to Produce Difluorodimethylsilane as Useful Commodity. ACS Sustainable Chem. Eng. 2015, 3, 163-169.

N. M. R. Chipa; V. P. Jatakiya; P. A. Gediya; S. M. Patel, and D. J. Sen. Green Chemistry: an Unique Relationship Between Waste and Recycling, Int. J. Adv. Pharm. Res., 2013, 4(7), 2000-2008.

Li, F. Xia, J.; Xiong, Y.; Tang, X.; Cheng, Y. Process for Preparation of Epichlorohydrin and Dichloropropanol Intermediates, Faming Zhuanli Shenqing, 101195607, 2008.

Al-Juald, S. S.; Eaborn, C.; El-Kheli, M. N. A.; Hitchcock, P. B.; Lickiss, P. D.; Molla, M. E.; Smith, J. D.; Zora, J. A. Tris(trimethylsilyl)methyl and Tris(dimethylphenylsilyl)methyl Derivatives of Boron. Crystal Structures of Dihydroxy[tris(trimethylsilyl)methyl]borane and of the Lithium-Boron Complex [(MeOH)2Li (µ-OMe)2B(OMe)2]. J. Chem. Soc., Dalton Trans.: Inorganic Chem., 1989, 3, 447-52.

Ishihara, K.; Kondo, S.; Yamamoto, H. Scope and Limitations of Chiral B-[3,5-Bis(trifluoromethyl)phenyl] oxazaborolidine Catalyst for Use in the Mukaiyama Aldol Reaction. J. Org. Chem., 2000, 65(26), 9125-9128.

PCT/EP2020/055166; International Search Report and Written Opinion of the International Searching Authority dated May 19, 2020.

\* cited by examiner

METHOD FOR COMPLETE RECYCLING OF INORGANIC-FIBER REINFORCED EPOXY COMPOSITES WITH BORON HALIDES

This application is a national phase of International Application No. PCT/EP2020/055166 filed 27 Feb. 2020, which claims priority to Germany (Federal Republic of) Application No. 102019106524.0 filed 14 Mar. 2019, the entire disclosures of which are hereby incorporated by reference.

The present invention is related to the full recycling of a composite material comprising inorganic or organic fibers and an epoxy resin in a one pot reaction.

Fiber-reinforced polymers are composite materials made of a polymer matrix reinforced with fibers. The fibers are usually glass (glass-fiber-reinforced plastic, GRP), carbon (carbon-fiber-reinforced plastic, CRP), aramid, or basalt. Rarely, other fibers such as paper, wood, or asbestos have been used, too. [1] The polymer is usually an epoxy, vinylester, or polyester thermosetting plastic, though phenol formaldehyde resins are still in use. [2] Fiber-reinforced polymers are increasingly used in the aerospace, automotive, in sports, in ballistic armor, marine, wind turbines and construction industries. In case of carbon fiber reinforced polymers (CRPs) effective recycling is needed primarily to recover intact carbon fiber—the most expensive component of CRPs —, and in case of glass fiber epoxy composites (GRPs) efficient recycling is mainly needed to obtain low molecular compounds for re-use in remanufacturing of the epoxy resins. In both cases complete recycling means use of a sustainable technology, additionally.

Full recycling of fiber-reinforced polymers involves recycling of both the fibers as well as the polymer matrix. Chemical recycling of fiber-reinforced polymers so far either utilizes high temperatures or strong oxidation conditions in suitable solvents. However, the methods known in the art suffer from high energy consumption, partial reshaping of the fibers, and low recovery rates. [3-20]

It is therefore the object of the present invention to provide a method for complete recycling of inorganic fiber reinforced epoxy composites overcoming the drawbacks of the prior art, in particular a method for complete recycling of inorganic fiber reinforced epoxy composites having lower energy consumption, maintaining the original fiber structure and quality and leading to high recovery rates. [21]

This object is achieved by a method for recycling a composite material comprising inorganic fibers and/or organic fibers, preferably inorganic fibers and an epoxy-resin in a one pot reaction, wherein the method comprises reacting the composite material with a boron halide in a solvent.

The invention provides a chemical method for the complete recycling of various inorganic (for example, glass (GRPs) and carbon (CRPs)) fiber reinforced epoxy composites with boron halides. The process is a one pot method and may be considered to involve (without, however, necessarily limiting the scope of the invention to this assumption) two steps; the first one is the separation of inorganic fiber from the epoxy resin, and the second one the complete cleavage of the ether bonds within the epoxy polymer to result in two low molecular weight building blocks.

It was surprisingly found by the inventors that the inventive method allows a recovery rate of glass and carbon fibers of about 90% and a conversion rate of the epoxy resin from 75 to 95%.

In particular, the present invention allows complete recycling of the fiber reinforced epoxy resins. "Complete recycling" in this regard refers to a recycling process in which significant amounts of inorganic fibers as well as significant amounts of the epoxy resin are recycled. In particular, the term refers to a recycling process in which, at the same time, 90% or more of the inorganic fibers and 75% or more of the epoxy resin can be recycled. [22]

Without being bound to this theory, it may be assumed that the inventive method involves 3 types of bond cleavage within a one-pot reaction: between the cured epoxy resins and the coated fibers, the crosslinkers and the epoxy polymers and finally their O—$C_3$-units, regioselectively.

The inorganic fibers may be glass fibers and/or carbon fibers. In this way, particular good recovery rates regarding the inorganic fibers have been observed.

The epoxy resin may be an aryl alkyl ether resin, in particular, it may be an epoxy resin comprising bisphenol-based monomer units and polyol-based monomer units. In this way, particular good recovery rates regarding the epoxy resin have been achieved. An epoxy resin is a polyether having, in principle, two terminal epoxide groups. In this regard, an aryl alkyl ether resin is such a resin in which aryl groups are connected with alkyl groups by an ether group to form the resin. A bisphenol-based monomer unit in this regard is a monomer unit comprised in the epoxy resin wherein the two hydroxyl groups comprised in a bisphenol molecule (provided that these groups are not the terminal groups of the epoxy resin) are involved in the ether bond of the epoxy resin.

In case that the epoxy-resin comprises bisphenol-based monomer units it may be provided that the bisphenol-based monomer units are brominated. In this way, the epoxy-resin has flame retardant properties.

The boron halide may be a trihaloborane (boron trihalide), an organyldihaloborane, an organyloxydihaloborane or mixtures of two or more thereof. In this regard, it is particularly preferred that the trihaloborane is selected from $BCl_3$ and $BBr_3$. It is further preferred that the organyldihaloborane or organyloxydihaloborane, respectively, has the following Formula organyl-$BHal_2$ or organyl-$OBHal_2$, wherein organyl is alkyl, preferably methyl, ethyl, n-propyl, iso-propyl, n-butyl, tert-butyl, or aryl, preferably phenyl or substituted phenyl (substituent methyl, fluoro, chloro), and Hal is independently selected from Cl or Br. When using one or more of the above preferred trihaloboranes, the best recovery rates with respect to inorganic fibers and epoxy resin have been observed.

The solvent may be selected from the groups of hydrocarbons and chlorinated hydrocarbons, consisting of dichloromethane, trichloromethane, 1,2-dichloroethane, trichloroethylene, tetrachloroethylene, hexanes, cyclohexanes, methylcyclohexanes, heptanes, octanes, toluene, m-xylene, p-xylene, chlorobenzene, o-dichlorobenzene, in-dichlorobenzene, indane, tetraline, cis-decaline, trans-decaline and a mixture of two or more thereof. The choice of one or more of the above solvents results in best recovery rates.

The reacting may be performed at a temperature from 0 to 150° C., preferably from 15 to 30° C.

Furthermore, the reacting may be performed at a pressure from 1 to 50 bar, preferably at ambient pressure. In this regard, it is most preferred that the reaction is carried out under ambient conditions (room temperature and normal pressure). In this way, best balance between recovery rate and energy consumption characteristics is achieved.

The inventive method may further comprise a step, after the reacting, of using one or more of the products achieved by the reacting of the composite material comprising organic or inorganic fibers and an epoxy-resin with the boron halide. A subsequent use in this regard (forming the further step) may be using one of the recycled materials, such as the inorganic fibers, for new applications. The recycled fibers are possessing new product quality. Likewise, the subsequent use may encompass remanufacturing one or more of the chemicals. For example, $BCl_3$ reacts after $C_{Alk}$—O cleavage of an epoxy resin and successive hydrolysis to boric acid ($H_3BO_3$). The subsequent use in this regard may then be heating to produce $B_2O_3$ from $H_3BO_3$ and, by reacting under appropriate conditions (C+$Cl_2$), converting this compound into $BCl_3$ again. Likewise, the monomer units of the epoxy resin may together or separately be used for preparing new epoxy resins or to undergo other reactions. The industrial by-product of this production, an aqueous sodium chloride solution, may then be used for the electrolysis to give caustic soda and chlorine, again. The caustic soda may then be used again to couple the bisphenols with the 1,3-dihalopropanes. This way, a chain of recyclic processes ("full recycling", sustainable method) is generated.

Furthermore, it may be provided that the bisphenol-based monomer units comprise non-brominated bisphenol-based monomer units and brominated bisphenol-based monomer units and the method comprises a further step of crystallizing to separate the non-brominated bisphenol-based monomer units and the brominated bisphenol-based monomer units from each other.

In the following, the present application will be explained in greater detail by referring to a particular preferred embodiment. However, it shall be noted that this preferred embodiment is not necessarily limiting for the scope of the claims. Furthermore, it shall be noted that one or more aspects of this preferred embodiment, for example specific compounds, specific groups of compounds referred to by generic expressions, reaction conditions etc. may separately and in any combination be combined with the foregoing generic features.

In a preferred embodiment, there is a method for the complete recycling of different glass and carbon fiber reinforced epoxy composites with trihaloboranes, organyldihaloboranes, organyloxydihaloboranes or mixtures thereof. The bisphenol based epoxy resins in the starting composites may contain flame retardants such as tetrabromobisphenol A (TBBA). The one pot method involves two steps: the first one is the separation of glass or/and carbon fibers from the epoxy polymer and the second one is the complete cleavage of the polymer to two types of low molecular weight compounds: 1) bisphenols, such as bisphenol A (BPA) or tetrabromobisphenol A (TBBA), and 2), glycerol derivatives, such as 1,3-dichloropropan-2-ol and 1,2,3-tribromopropane. Boron halides such as boron trichloride and boron tribromide, organylhaloboranes such as phenyldichloroborane or methyldibromoborane or organyloxydihaloboranes such as phenyloxydichloroborane or methoxydibromoborane can either be used as pure compounds OR as a solution in (halogenated) hydrocarbons such as dichloromethane or heptane. The schematic presentation of a process for the recycling of glass and/or carbon fiber reinforced epoxy composites with boron trichloride is shown in scheme 1.

Scheme 1.

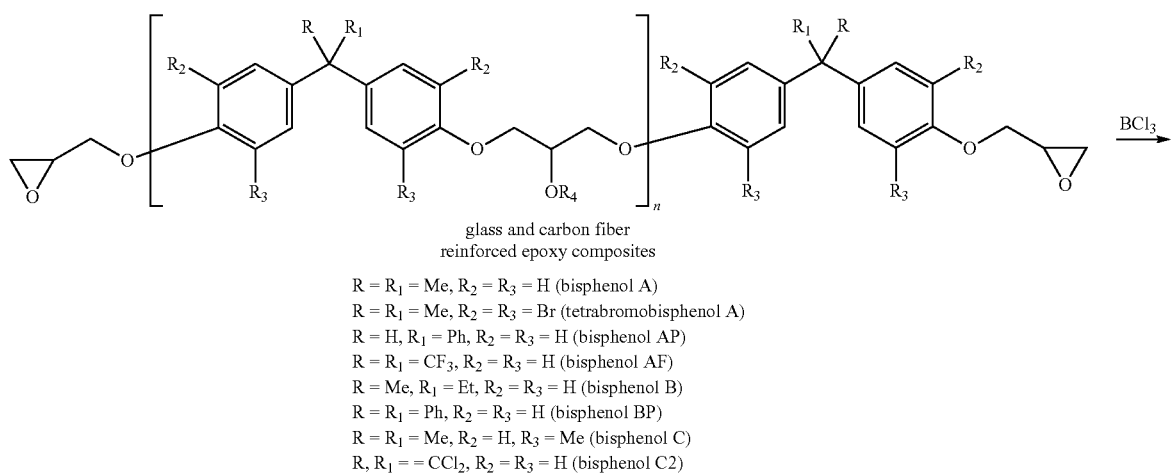

glass and carbon fiber reinforced epoxy composites

R = $R_1$ = Me, $R_2$ = $R_3$ = H (bisphenol A)
R = $R_1$ = Me, $R_2$ = $R_3$ = Br (tetrabromobisphenol A)
R = H, $R_1$ = Ph, $R_2$ = $R_3$ = H (bisphenol AP)
R = $R_1$ = $CF_3$, $R_2$ = $R_3$ = H (bisphenol AF)
R = Me, $R_1$ = Et, $R_2$ = $R_3$ = H (bisphenol B)
R = $R_1$ = Ph, $R_2$ = $R_3$ = H (bisphenol BP)
R = $R_1$ = Me, $R_2$ = H, $R_3$ = Me (bisphenol C)
R, $R_1$ = = $CCl_2$, $R_2$ = $R_3$ = H (bisphenol C2)

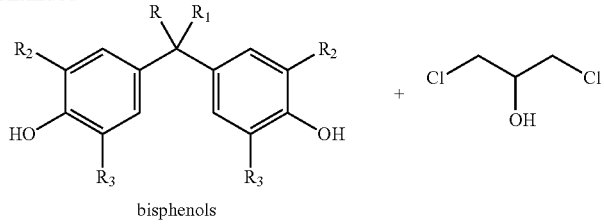

bisphenols

R = H, R₁ = Me, R₂ = R₃ = H (bisphenol E)
R = R₁ = R₂ = R₃ = H (bisphenol F)
R = R₁ = Me, R₂ = H, R₃ = i-Pr (bisphenol G)
R = R₁ = Me, R₂ = H, R₃ = Ph (bisphenol PH)
R, R₁ = CH₂CH(CH₃)CH₂C(CH₃)₂CH₂,
R₂ = R₃ = H (bisphenol TMC or isophorone bisphenol)
R, R₁ = (CH₂)₅, R₂ = R₃ = H (bisphenol Z)
R, R₁ = fluoren-9,9-diyl, R₂ = R₃ = H (bisphenol Z)
R₄ any hardener Schematic presentation of a process for the recycling of glass and carbon fiber reinforced epoxy composites with boron trichloride.

1,3-Dichloropropan-2-ol is a well-known precursor for the synthesis of epichlorohydrin which itself can be converted into bisphenol diglycidyl ether upon reaction with bisphenols, an important building block as well for the manufacturing of epoxy resins as for monomers for other resins and polymers (scheme 2). [23]

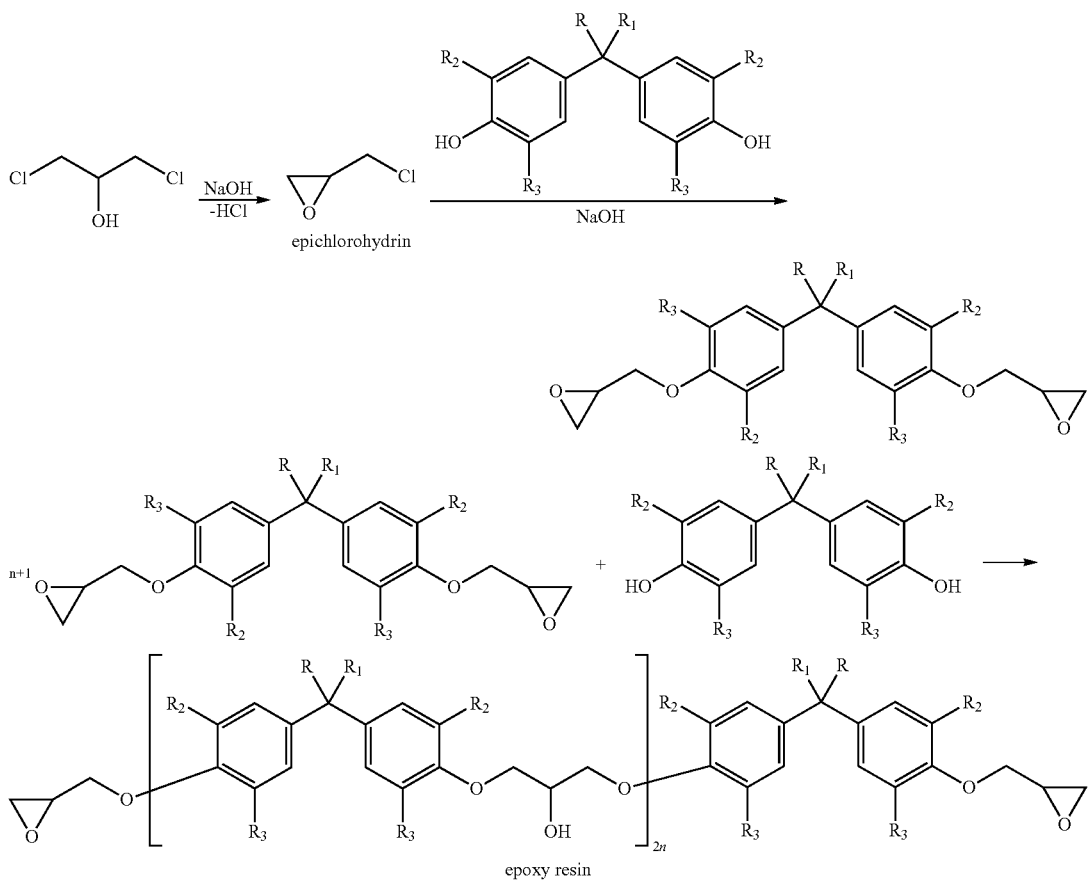

Reuse of 1,3-dichloro-2-propanol for the preparation of epoxy resins.

In particular, more widely used glass and carbon fiber reinforced BPA or BPA-TBBA epoxy composites according to the present invention undergo complete recycling with boron trihalides, organyldihaloboranes or organyloxydihaloboranes to obtain BPA, TBBA, 1,3-dichloropropan-2-ol or 1,2,3-tribromopropane, respectively. The organic products can be easily separated either by distillation or recrystallization. The recovery rate of glass and carbon fibers reaches 90%, the conversion rate of the epoxy matrix 75-95%. The schematic presentation of a process for the recycling of glass and carbon fiber reinforced BPA or BPA-TBBA epoxy composites with trihaloboranes, organyldihaloboranes or organyloxydihaloboranes is shown in scheme$_3$.

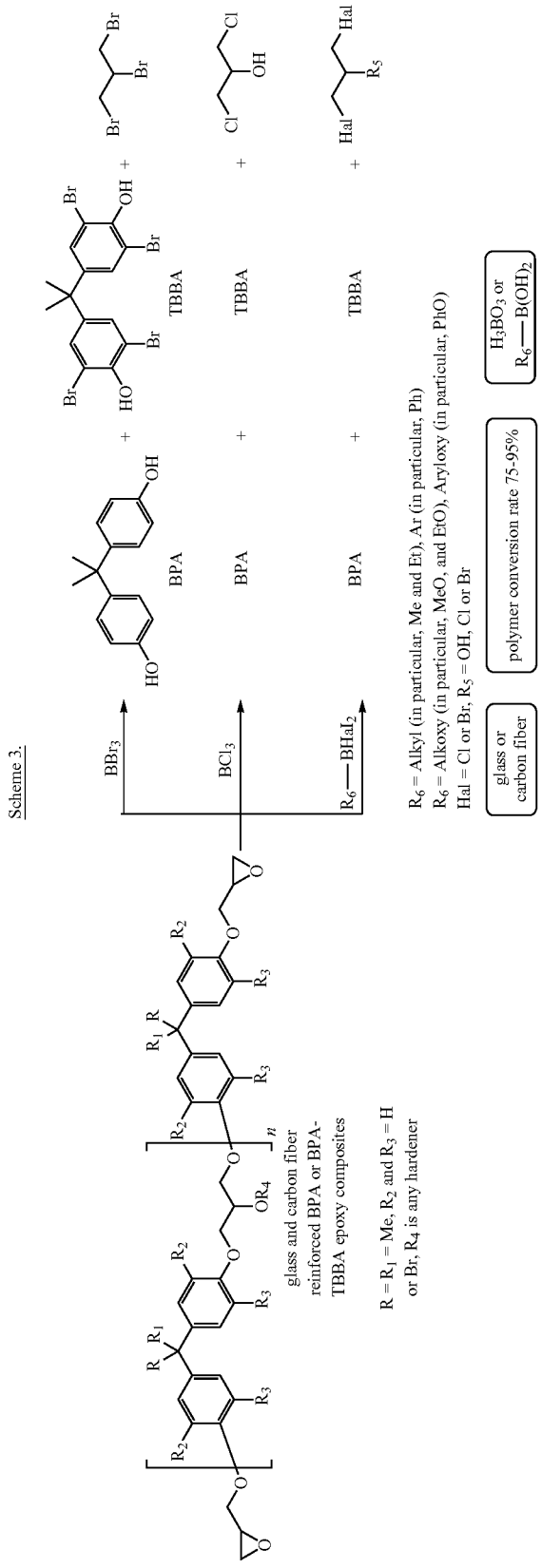

During work-up the worked-off trihaloboranes or organyloxydihaloboranes are converted into boric acid. Using the BCl₃ circulation process (BCl₃→H₃BO₃→B₂O₃→BCl₃) it is feasible to regain pure boron trichloride (scheme 4), which can be used for the recycling of glass and carbon fiber reinforced epoxy composites, again. In 2007, about 3.8 million tons of boron trioxide $B_2O_3$ were produced worldwide.

Scheme 4.

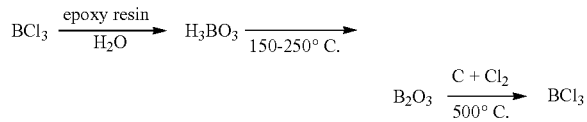

Process for the circulation of boron trichloride.

By use of organyldihaloboranes the consumed boron derivatives after work-up are converted into triorganylboroxines which can also be used for the preparation of organyldihaloboranes by treatment with $AlCl_3$, $BCl_3$, $PCl_5$ or $BBr_3$ according to the literature [24-26].

In the following, the invention will be described referring to specific examples and the Figures wherein FIG. 1 from sample 5 shows six pieces of composite DE104 ((a), each ca. 18×10×1.5 mm, total weight 3.02 g), glass fiber pieces (b) obtained from DE104 after treatment with 30 mL of a 1M solution of $BCl_3$ (3.52 g, 30.00 mmol) in DCM for 24 h at room temperature, then 64 h at 50-55° C. and the four separate fractions VZ-DE-1-1 to VZ-DE-1-4 (c) weighing 370 mg (1,3-dichloropropan-2-ol and a mixture of bisphenol derivatives), 280 mg (BPA, TBBA and small impurities of 1,3-dichloropropan-2-ol), 40 mg (oligomers and polymers) and 270 mg (oligomers and polymers), respectively.

Figure 2:
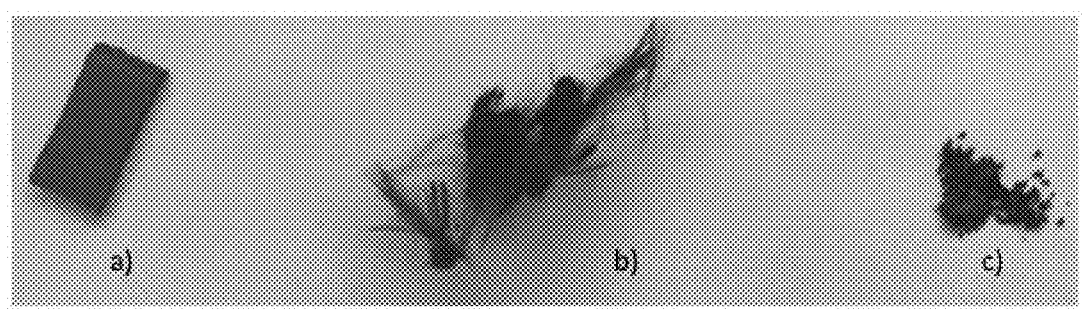

FIG. 2 from sample 9 shows carbon fiber reinforced epoxy composite from a wind turbine ((a), 18×9×1.5 mm, 493 mg), a part of carbon fiber obtained from it after treatment with 1M solution of $BCl_3$ in dry DCM at 60-65° C. for 70 h (b) and partly product VZ-CFK-V3 (mixture of BPA and polymer) (c).

FIG. 3

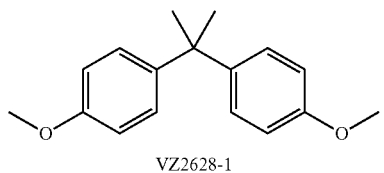

VZ2628-1

¹H-NMR (400 MHz, CDCl₃)
Shift ppm 1.66 (d, J = 126.66 Hz)
Shift ppm 3.80 (d, J = 143.50 Hz)
Shift ppm 6.82 (d, J = 8.84 Hz)
Shift ppm 7.17 (d, J = 8.84 Hz)

Current Data Parameters
NAME vz2628-1
EXPNO 10
PROCNO 1
F2 - Acquisition Parameters
Date_ 20160223
Time 18.57
INSTRUM spect
PROBHD 5 mm PABBO BB-
PULPROG zg30
TD 65536
SOLVENT CDCl3
NS 16

FIG. 4

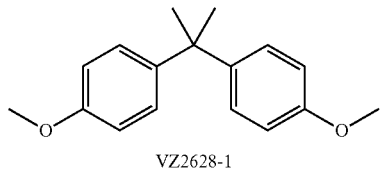

VZ2628-1

¹³C-NMR in CDCl₃, 100 MHz

Current Data Parameters
NAME vz2628-1
EXPNO 11
PROCNO 1
F2 - Acquisition Parameters
Date_ 20160223
Time 19.27
INSTRUM spect
PROBHD 5 mm PABBO BB-
PULPROG zgpg30
TD 65536
SOLVENT CDCl3
NS 512

FIG. 5

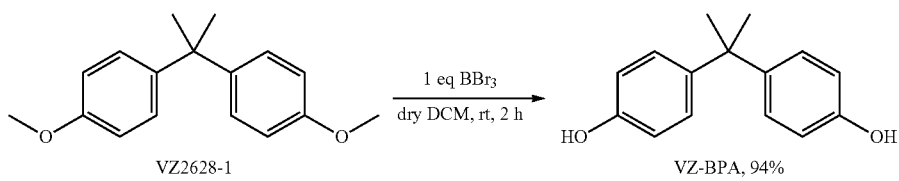

VZ2628-1                    VZ-BPA, 94%

¹H-NMR (400 MHz, DMSO-d₆)
Shift ppm 1.52 (d, J = 126.42 Hz)
Shift ppm 6.63 (d, J = 8.70 Hz)
Shift ppm 6.97 (d, J = 8.70 Hz)
VZ-BPA Current Data Parameters
NAME vz-BPA
EXPNO 10
PROCNO 1
F2 - Acquisition Parameters
Date_ 20160321
Time 14.46
INSTRUM spect
PROBHD 5 mm PABBO BB-
PULPROG zg30
TD 65536
SOLVENT DMSO
NS 16

FIG. 6

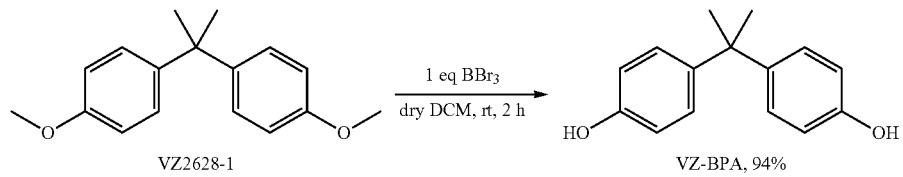

VZ-BPA
$^{13}$C-NMR in DMSO-d$_6$, 100 MHz

Current Data Parameters
NAME vz-BPA
EXPNO 11
PROCNO 1
F2 - Acquisition Parameters
Date_ 20160321
Time 15.17
INSTRUM spect
PROBHD 5 mm PABBO BB-
PULPROG zgpg30
TD 65536
SOLVENT DMSO
NS 512

FIG. 7

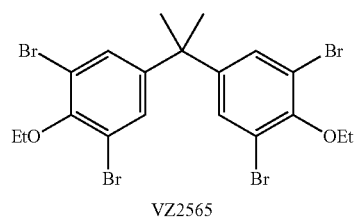 [SMILES: CCOc1c(Br)cc(C(C)(C)c2cc(Br)c(OCC)c(Br)c2)cc1Br]

VZ2565

$^1$H-NMR (400 MHz, CDCl$_3$)
Shift ppm 1.48 (t, J = 7.00 Hz)
Shift ppm 4.08 (q, J = 7.00 Hz)
Shift ppm 7.29 (dd, J = 2.26, 164.17 Hz)

Current Data Parameters
NAME vz2565
EXPNO 10
PROCNO 1
F2 - Acquisition Parameters
Date_ 20150831
Time 17.02
INSTRUM spect
PROBHD 5 mm PABBO BB-
PULPROG zg30
TD 65536
SOLVENT CDCl3
NS 16

FIG. 8

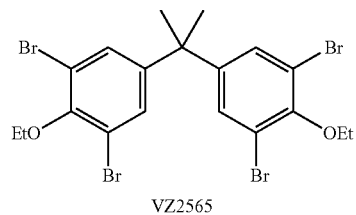 [SMILES: CCOc1c(Br)cc(C(C)(C)c2cc(Br)c(OCC)c(Br)c2)cc1Br]

VZ2565

$^{13}$C-NMR in CDCl$_3$, 100 MHz

Current Data Parameters
NAME vz2565
EXPNO 11
PROCNO 1
F2 - Acquisition Parameters
Date_ 20150831
Time 17.32
INSTRUM spect
PROBHD 5 mm PABBO BB-
PULPROG zgpg30
TD 65536
SOLVENT CDCl3
NS 512

FIG. 9

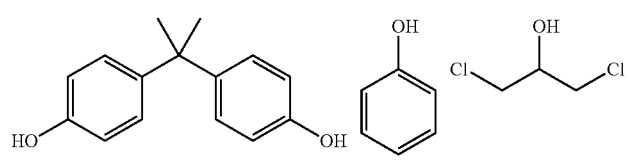

$^1$H-NMR spectrum (400 MHz, DMSO-d$_6$) of
VZ-G10-4-1 (a mixture of BPA, phenol and
1,3-dichloropropan-2-ol (relation 100:0.50:1.12,
respectively) from cleavage of G10 with
BCl$_3$)

Current Data Parameters
NAME vz-G10-4-1
EXPNO 10
PROCNO 1
F2 - Acquisition Parameters
Date_ 20160920
Time 15.47
INSTRUM spect
PROBHD 5 mm PABBO BB-
PULPROG zg30
TD 65536
SOLVENT DMSO
NS 64

FIG. 10

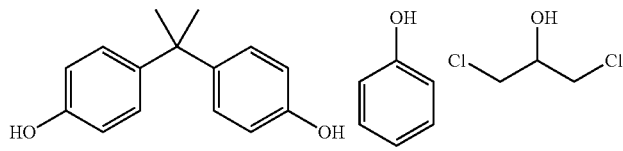

$^{13}$C-NMR spectrum (100 MHz, DMSO-$d_6$) of VZ-G10-4-1 (a mixture of BPA, phenol and 1,3-dichloropropan-2-ol (relation 100:0.50:1.12, respectively) from cleavage of G10 with BCl$_3$)

Current Data Parameters
NAME vz-G10-4-1
EXPNO 11
PROCNO 1
F2 - Acquisition Parameters
Date_ 20160920
Time 16.10
INSTRUM spect
PROBHD 5 mm PABBO BB-
PULPROG zgpg30
TD 65536
SOLVENT DMSO
NS 512

Figure 11:
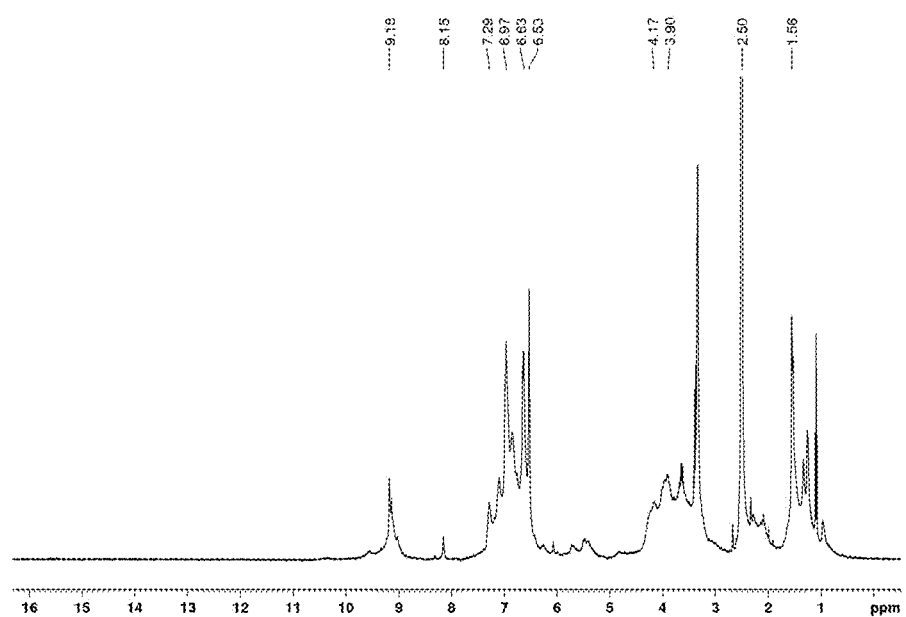

FIG. 11
$^1$H-NMR spectrum (400 MHz, DMSO-$d_6$) of VZ-G10-4-2 (a mixture of oligomers with small amounts of BPA and phenol from cleavage of G10 with BCl$_3$)

Current Data Parameters
NAME vz-G10-4-2
EXPNO 10
PROCNO 1
F2 - Acquisition Parameters
Date_ 20160921
Time 15.43
INSTRUM spect
PROBHD 5 mm PABBO BB-
PULPROG zg30
TD 65536
SOLVENT DMSO
NS 64

Figure 12:
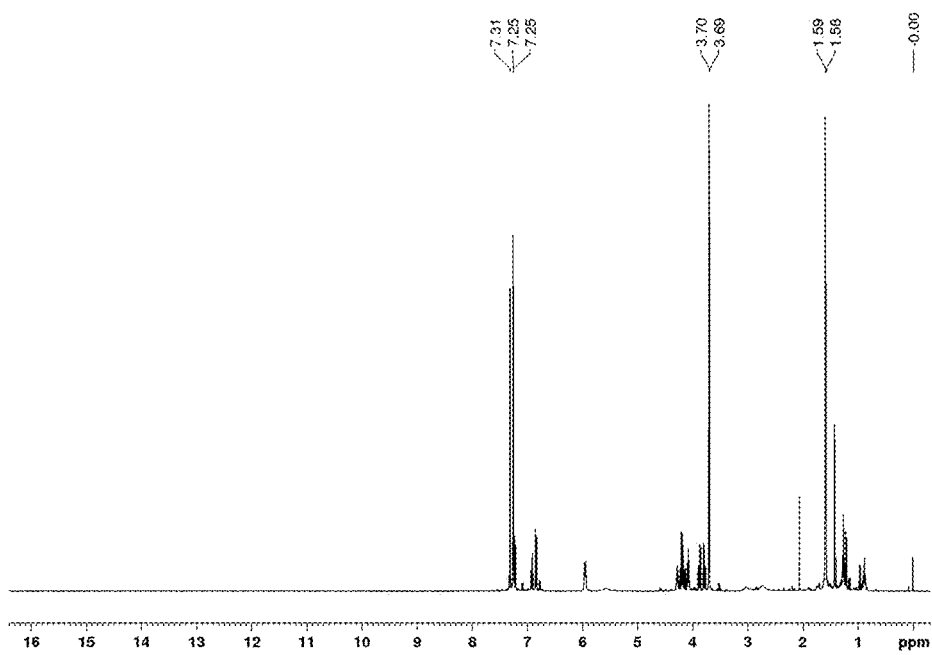
Figure 13:
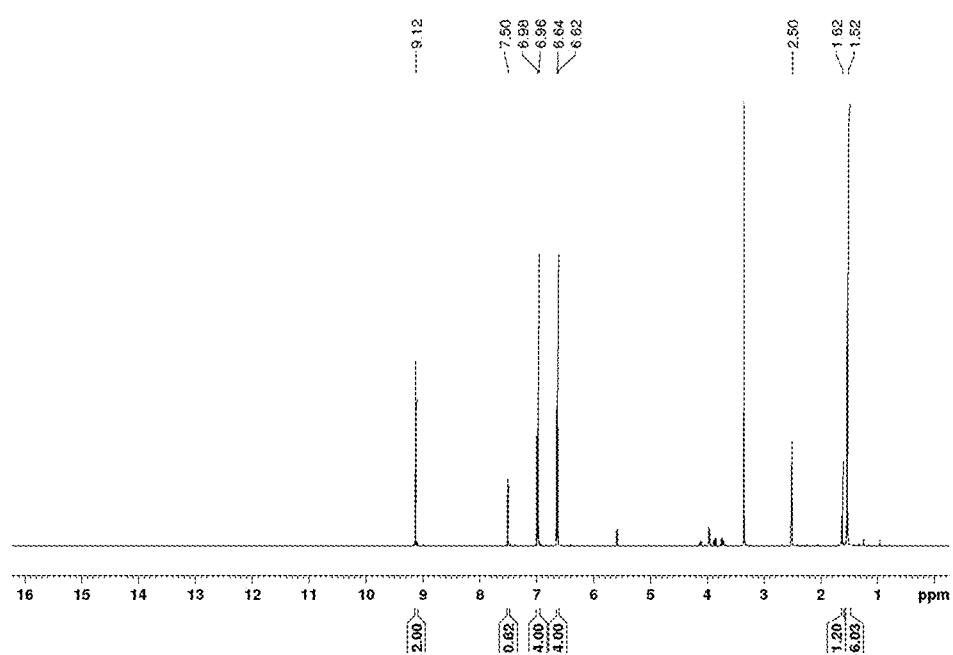

FIG. 12
$^1$H-NMR spectrum (400 MHz, CDCl$_3$) of VZ-DE-1-1 (1,3-dichloropropan-2-ol and a mixture of bisphenol derivatives - first fraction after treatment of DE104 with BCl$_3$)

Current Data Parameters
NAME vz-DE-1-1
EXPNO 10
PROCNO 1
F2 - Acquisition Parameters
Date_ 20160817
Time 15.55
INSTRUM spect
PROBHD 5 mm PABBO BB-
PULPROG zg30
TD 65536
SOLVENT CDCl3
NS 16

FIG. 13

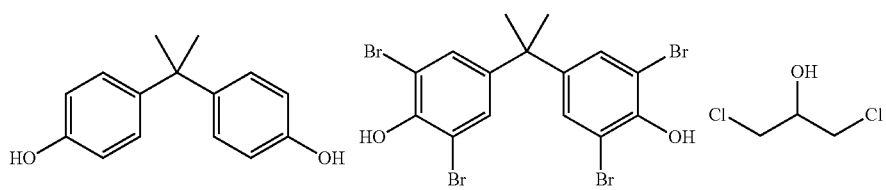

$^1$H-NMR spectrum (400 MHz, DMSO-$d_6$) of VZ-DE-1-2 (BPA, TBBA and small impurities of 1,3-dichloropropan-2-ol-second fraction after treatment of DE104 with BCl$_3$)

Current Data Parameters
NAME vz-DE-1-2
EXPNO 10
PROCNO 1
F2 - Acquisition Parameters
Date_ 20160818
Time 15.48
INSTRUM spect
PROBHD 5 mm PABBO BB-
PULPROG zg30
TD 65536
SOLVENT DMSO
NS 64

Figure 14:
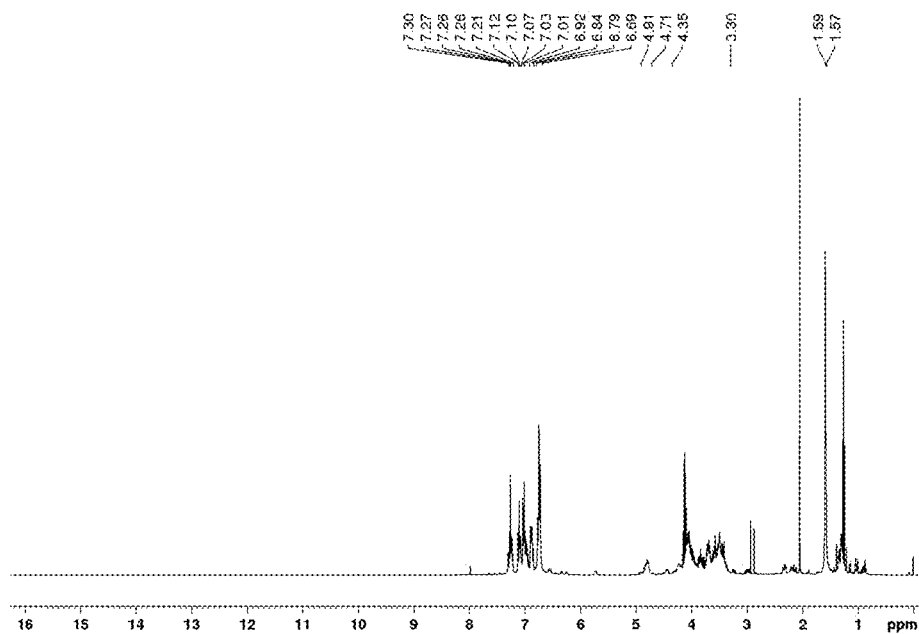
Figure 15:
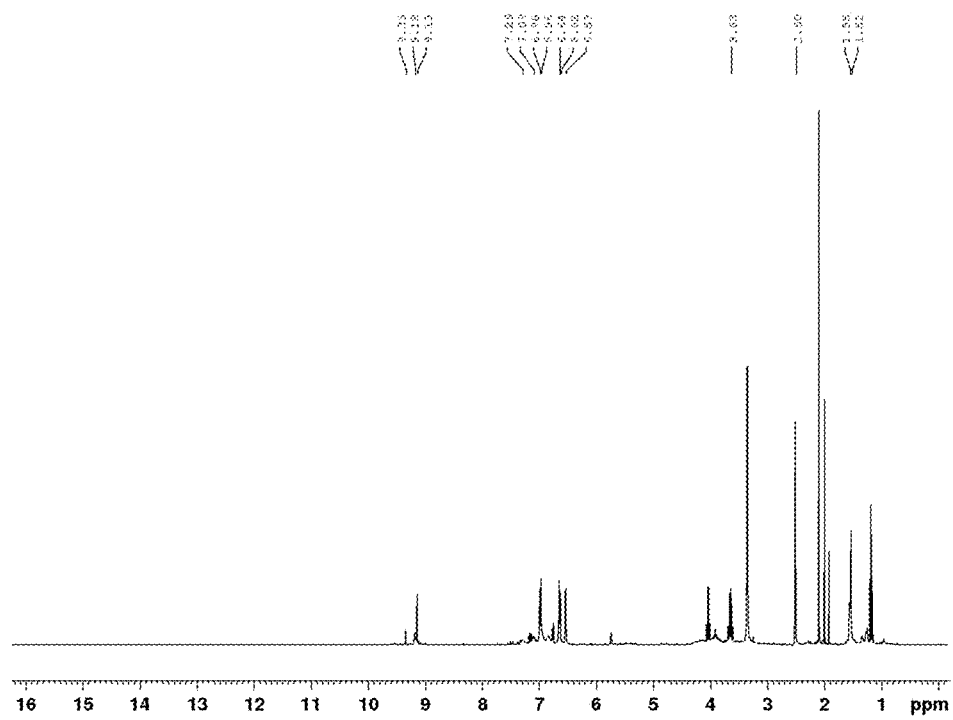

FIG. 14
$^1$H-NMR spectrum (400 MHz, CDCl$_3$) of VZ-DE-1-3 (oligomers and polymers - third fraction after treatment of DE104 with BCl$_3$)

Current Data Parameters
NAME vz-DE-1-3
EXPNO 10
PROCNO 1
F2 - Acquisition Parameters
Date_ 20160817
Time 15.42
INSTRUM spect
PROBHD 5 mm PABBO BB-
PULPROG zg30
TD 65536

FIG. 15

¹H-NMR spectrum (400 MHz, DMSO-d$_6$) of
VZ-DE-1-4 (oligomers and polymers - fourth
fraction after treatment of DE104 with BCl$_3$)

SOLVENT CDCl3
NS 64

Current Data Parameters
NAME vz-DE-1-4
EXPNO 10
PROCNO 1
F2 - Acquisition Parameters
Date_ 20160818
Time 15.36
INSTRUM spect
PROBHD 5 mm PABBO BB-
PULPROG zg30
TD 65536
SOLVENT DMSO
NS 64

FIG. 16

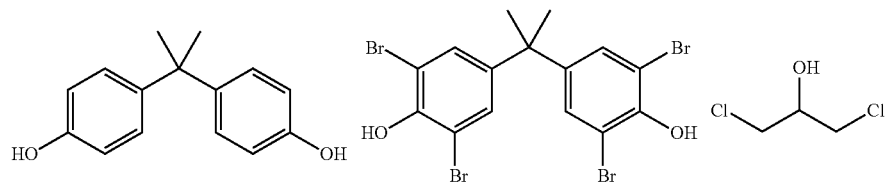

¹H-NMR spectrum (400 MHz, DMSO-d$_6$) of
VZ-MPM-C3 (a mixture of BPA, TBBA and
1,3-dichloropropan-2-ol (relation 1:0.5:2,
respectively) from cleavage of recyclate MPM
with BCl$_3$)

Current Data Parameters
NAME vz-MPM-C3
EXPNO 10
PROCNO 1
F2 - Acquisition Parameters
Date_ 20160517
Time 15.31
INSTRUM spect
PROBHD 5 mm PABBO BB-
PULPROG zg30
TD 66536
SOLVENT DMSO
NS 16

FIG. 17

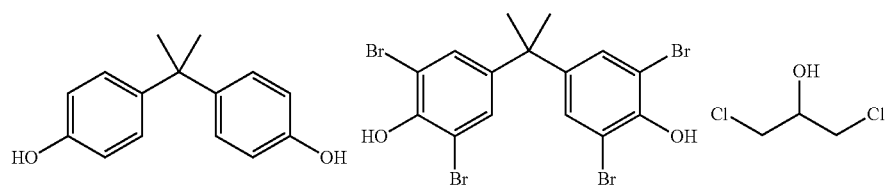

¹³C-NMR spectrum (100 MHz, DMSO-d$_6$) of
VZ-MPM-C3 (a mixture of BPA, TBBA and
1,3-dichloropropan-2-ol (relation 1:0.5:2,
respectively) from cleavage of recyclate MPM
with BCl$_3$)

Current Data Parameters
NAME vz-MPM-C3
EXPNO 11
PROCNO 1
F2 - Acquisition Parameters
Date_ 20160517
Time 16.01
INSTRUM spect
PROBHD 5 mm PABBO BB-
PULPROG zgpg30
TD 65536
SOLVENT DMSO
NS 512

FIG. 18

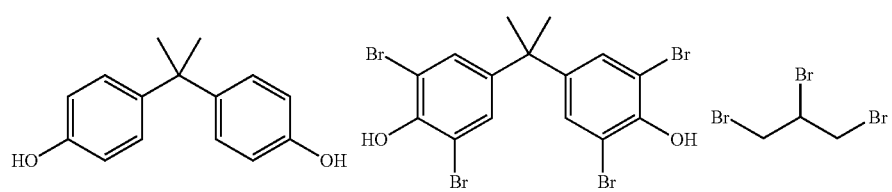

¹H-NMR spectrum (400 MHz, DMSO-d$_6$) of
VZ-MPM-BBr-2 (a mixture of BPA, TBBA
and 1,2,3-tribromopropane (relation 1:0.44:1.88, Current Data Parameters
NAME vz-MPM-BBr-2
EXPNO 10

FIG. 19

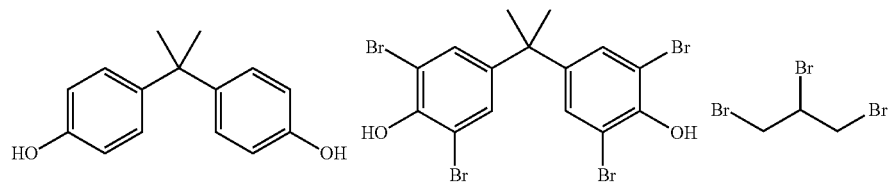

$^{13}$C-NMR spectrum (100 MHz, DMSO-d$_6$) of VZ-MPM-BBr-2 (a mixture of BPA, TBBA and 1,2,3-tribromopropane (relation 1:0.44:1.88, respectively) after treatment of recyclate MPM with BBr$_3$)

PROCNO 1
F2 - Acquisition Parameters
Date_ 20160502
Time 12.43
INSTRUM spect
PROBHD 5 mm PABBO BB-
PULPROG zg30
TD 65536
SOLVENT DMSO
NS 16

Current Data Parameters
NAME vz-MPM-BBr-2
EXPNO 11
PROCNO 1
F2 - Acquisition Parameters
Date_ 20160502
Time 12.57
INSTRUM spect
PROBHD 5 mm PABBO BB-
PULPROG zgpg30
TD 65536
SOLVENT DMSO
NS 512

FIG. 20

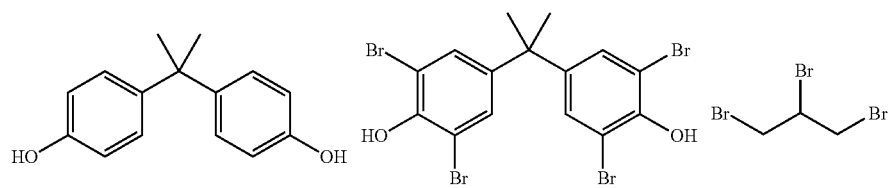

$^{13}$C-DEPT-NMR spectrum (100 MHz, DMSO-d$_6$) of VZ-MPM-BBr-2 (a mixture of BPA, TBBA and 1,2,3-tribromopropane (relation 1:0.44:1.88, respectively) after treatment of recyclate MPM with BBr$_3$)

Current Data Parameters
NAME vz-MPM-BBr-2
EXPNO 12
PROCNO 1
F2 - Acquisition Parameters
Date_ 20160502
Time 13.40
INSTRUM spect
PROBHD 5 mm PABBO BB-
PULPROG dept135
TD 65536
SOLVENT DMSO
NS 512

FIG. 21

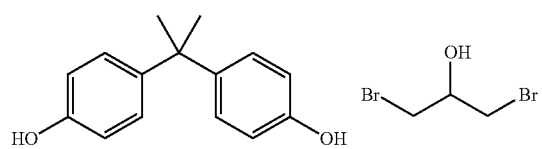 [SMILES: CC(C)(c1ccc(O)cc1)c1ccc(O)cc1 ; OC(CBr)CBr]

$^1$H-NMR spectrum (400 MHz, CDCl$_3$) of VZ-CFK-1 (a mixture of BPA, 1,2-dibromo-propan-2-ol and small impurities of undefined compounds after cleavage of CRP with BBr$_3$)
$^1$H NMR (400 MHz, CDCl$_3$)
Shift ppm 6.73 (d, J = 8.72 Hz)
Shift ppm 7.09 (d, J = 8.72 Hz)

Current Data Parameters
NAME vz-cfk-1
EXPNO 10
PROCNO 1
F2 - Acquisition Parameters
Date_ 20160728
Time 15.42
INSTRUM spect
PROBHD 5 mm PABBO BB-
PULPROG zg30
TD 65536
SOLVENT CDCl3
NS 64

FIG. 22

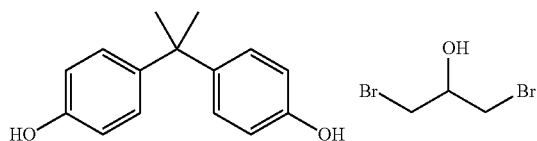 [SMILES: CC(C)(c1ccc(O)cc1)c1ccc(O)cc1 ; OC(CBr)CBr]

$^{13}$C-NMR spectrum (100 MHz, DMSO-d$_6$) of VZ-CFK-1 (a mixture of BPA, 1,2-dibromo-propan-2-ol and small impurities of undefined compounds after cleavage of CRP with BBr$_3$)

Current Data Parameters
NAME vz-CFK-1
EXPNO 11
PROCNO 1
F2 - Acquisition Parame
Date_ 20180202
Time 9.28
INSTRUM spect
PROBHD 5 mm PABBO BB-
PULPROG zgpg30
TD 65536
SOLVENT DMSO
NS 512

FIG. 23

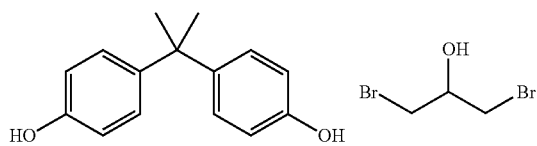 [SMILES: CC(C)(c1ccc(O)cc1)c1ccc(O)cc1 ; OC(CBr)CBr]

$^{13}$C-DEPT-NMR spectrum (100 MHz, DMSO-d$_6$) of VZ-CFK-1 (a mixture of BPA, 1,2-dibromopropan-2-ol and small impurities of undefined compounds after cleavage of CRP with BBr$_3$)

Current Data Parameters
NAME vz-CFK-1
EXPNO 12
PROCNO 1
F2 - Acquisition Parameter:
Date_ 20180202
Time 9.54
INSTRUM spect
PROBHD 5 mm PABBO BB-
PULPROG dept135
TD 65536
SOLVENT DMSO
NS 512

Figure 24:
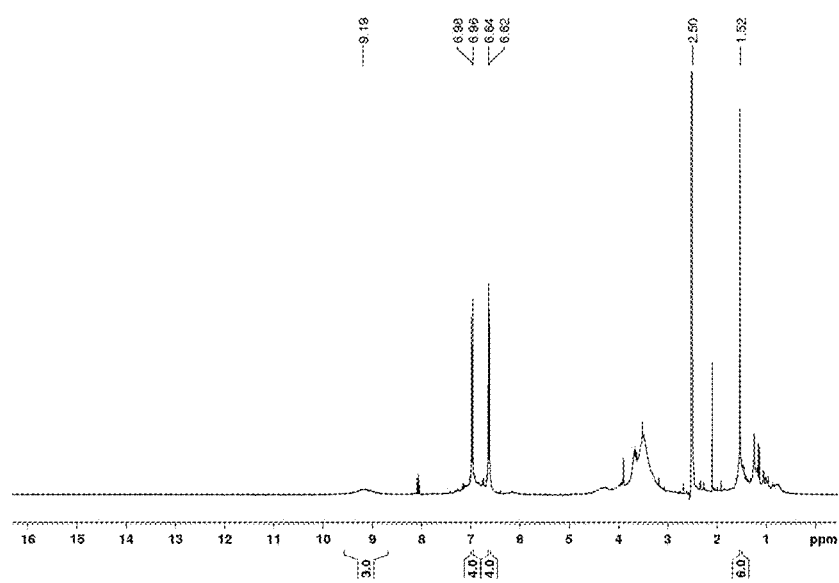

FIG. 24
$^1$H-NMR spectrum (400 MHz, DMSO-d$_6$) of VZ-CFK-V3 (a mixture of BPA and polymer after treatment of CRP with BCl$_3$)
$^1$H NMR (400 MHz, DMSO-d$_6$)
Shift ppm 6.63 (d, J = 8.70 Hz)
Shift ppm 6.97 (d, J = 8.70 Hz)

Current Data Parameters
NAME VZ-CFK-V3
EXPNO 10
PROCNO 1
F2 - Acquisition Parameters
Date_ 20180130
Time 19.42
INSTRUM spect
PROBHD 5 mm PABBO BB-
PULPROG zg30
TD 65536
SOLVENT DMSO

EXAMPLES

1) Synthesis of BPA Dimethyl Ether and Cleavage of the Ether Bond with Boron Tribromide.

Figure 3:
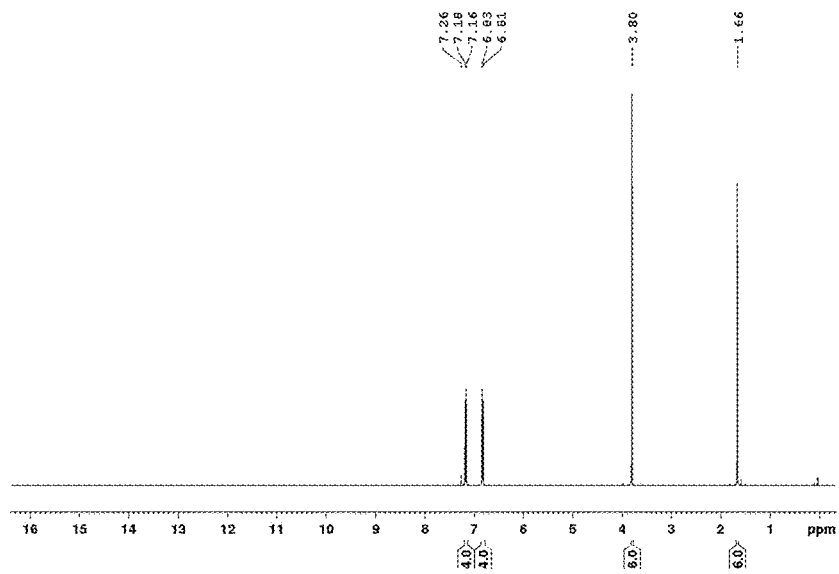
Figure 4:
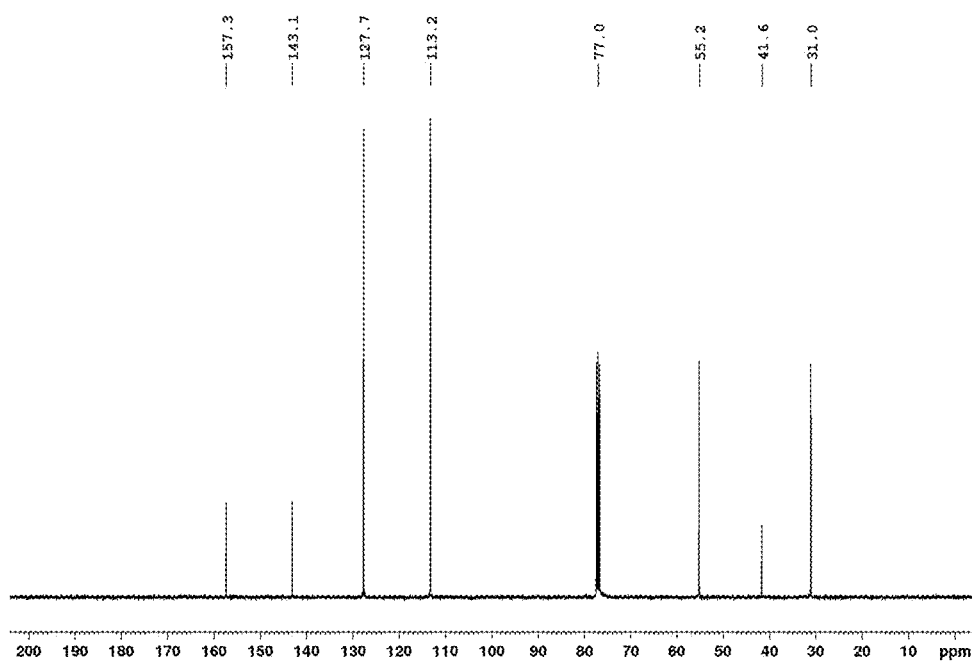
Figure 5:
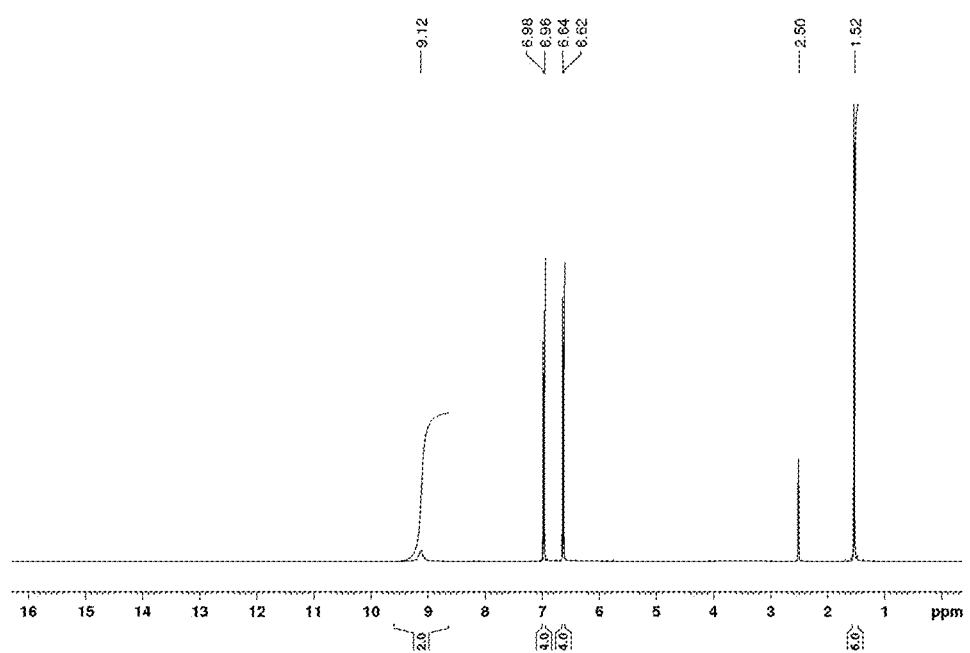
Figure 6:
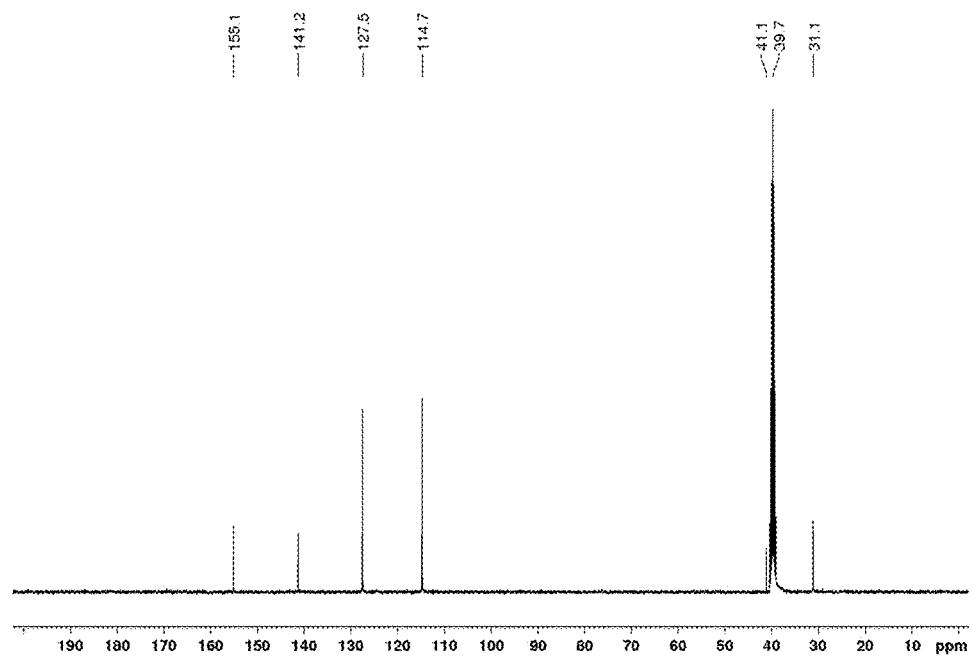

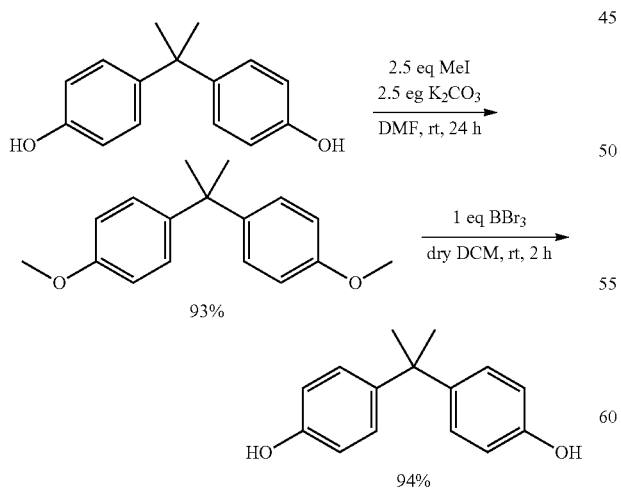

a) Synthesis of BPA dimethyl ether. To a mixture of BPA (2.28 g, 10.00 mmol) and potassium carbonate (3.48 g, 25.00 mmol) in 25 mL of DMF methyl iodide (3.55 g, 25.00 mmol) was added within to min at 0° C. The reaction mixture was then stirred at room temperature for 24 h, poured into 200 mL of cold water, treated with 5 mL conc. HCl under stirring and extracted with DCM (4×50 mL). The organic layer was washed with water (2×100 mL), dried with calcium chloride and concentrated under reduced pressure. After treatment with to mL hexane the precipitate was filtered with suction, washed with 5 mL hexane and dried under reduced pressure. BPA dimethyl ether was obtained as a white solid (yield 2.38 g, 93%).
Characterization was by $^1$H-NMR (FIG. 3) and $^{13}$C-NMR (FIG. 4).

b) Cleavage of the ether bond in BPA dimethyl ether with boron tribromide. To a solution of 0.095 mL (250 mg, 1.00 mmol) BBr$_3$ in to mL of dry DCM 256 mg (Loo mmol) of BPA dimethyl ether were added under stirring at room temperature. After 2 h, the reaction mixture was poured into too mL of ice water and extracted with DCM (4×20 mL). The organic layer was washed with water (2×50 mL), dried with calcium chloride and concentrated under reduced pressure. After treatment with 3 mL hexane the precipitate was filtered with suction, washed with 1 mL of hexane and dried under reduced pressure. BPA was obtained as a white solid (yield 215 mg, 94%).
Characterization was by $^1$H-NMR (FIG. 5) and $^{13}$C-NMR (FIG. 6).

2) Synthesis of TBBA Diethyl Ether and Cleavage of the Ether Bond with Boron Tribromide.

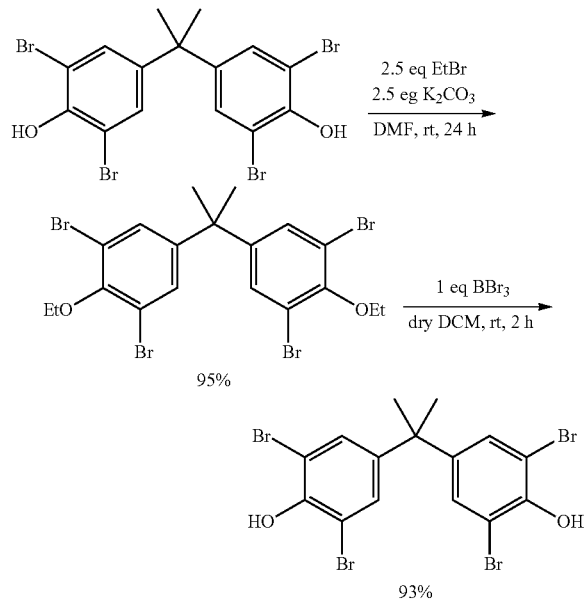

95%

93%

TBBA diethyl ether was obtained similarly to BPA dimethyl ether from TBBA (544 mg, 1.00 mmol) and ethyl bromide (2.50 eq). White solid, yield 570 mg, 95%.

Figure 7:
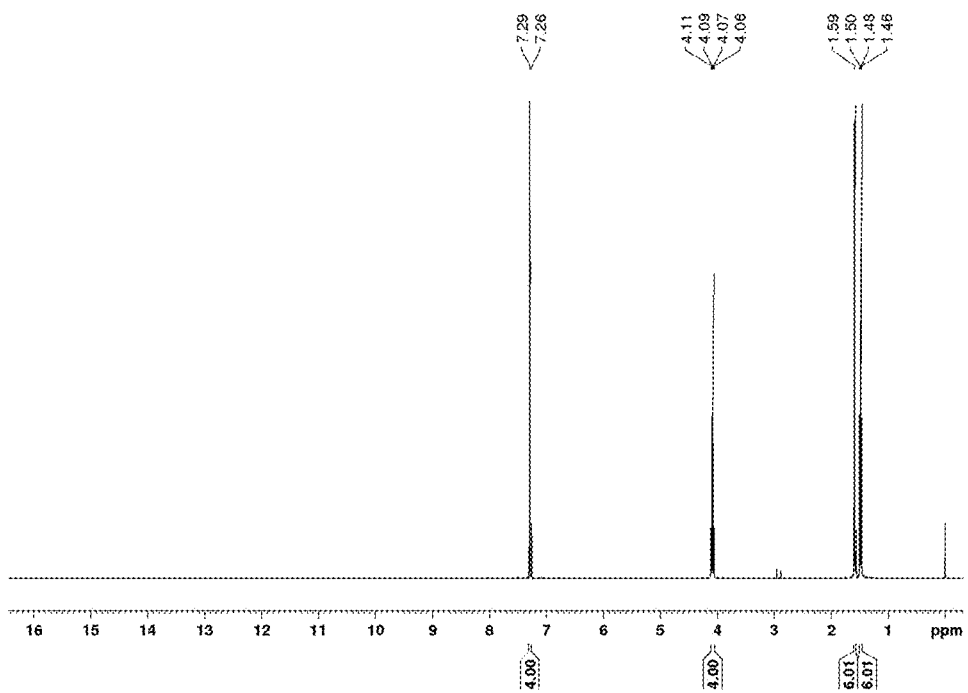
Figure 8:
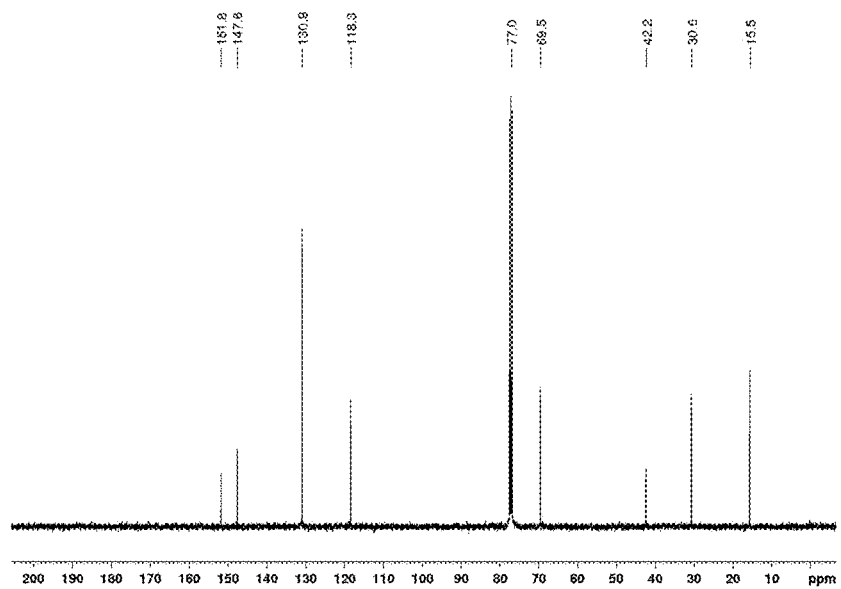

Characterization was by $^1$H-NMR (FIG. 7) and $^{13}$C-NMR (FIG. 8).

Cleavage of the ether bond in TBBA diethyl ether (300 mg, 0.50 mmol) with boron tribromide was carried out similarly to the synthesis of BPA from BPA dimethyl ether. White solid, yield 253 mg, 93%.

Characterization was by $^1$H-NMR and $^{13}$C-NMR.

3) Recycling of Bromine-Free Glass Fiber Reinforced Epoxy Composite Gin with BCl$_3$.

To a suspension of 3.00 g G10 powder (ca. 1.20 g polymer, content 40% in composite G10) in 10 mL of dry DCM in a 100 mL glass pressure vessel 10 mL of a 1M solution of BCl$_3$ (1.17 g, 10.00 mmol) in dry DCM were added; the reaction mixture was stirred for 24 h at room temperature, then 68 h at 55–60° C. After cooling to room temperature, the reaction mixture was poured into 200 mL of ice water and extracted with DCM (5×50 mL). The organic layer was dried with calcium chloride. Removal of the solvent in vacuum afforded 775 mg VZ-G10-4-1 as a dark viscous oil. According to the $^1$H-NMR spectra the product VZ-G10-4-1 was a mixture of 297 mg BPA, 148 mg phenol and 330 mg 1,3-dichloropropan-2-ol (relation 1.00: 0.50:1.12, respectively). The residue was washed (3×30 mL) with a mixture of acetone/methanol 1:1, then with ethyl acetate (5×50 mL). After removal of the solvents from the combined organic layers under reduced pressure, 30 mL of diethyl ether were added to the residue under stirring. The precipitate was filtered off with suction, washed with 5 mL of diethyl ether and dried under reduced pressure. The product VZ-G10-4-2 (220 mg) was obtained as a brown solid. According to the $^1$H-NMR spectra (FIG. 11) the product VZ-G10-4-2 was a mixture of oligomers with small amounts of BPA and phenol. Conversion of the organic part of the starting material was 83% (775+220=995/1200). The amount of the glass fiber after washing with methanol, water, acetone and drying in vacuum was 1920 mg.

Figure 9:
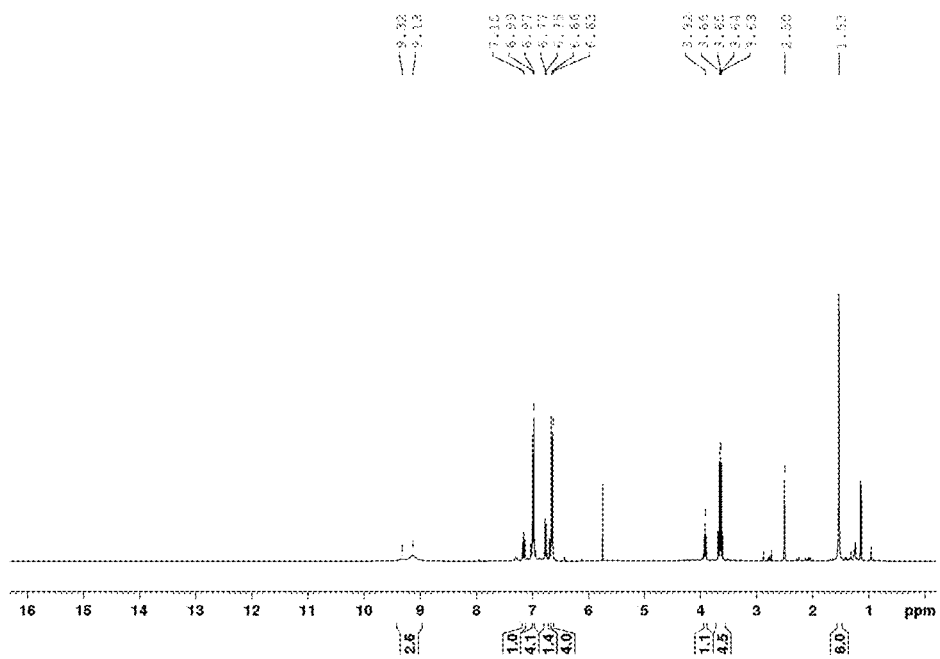
Figure 10:
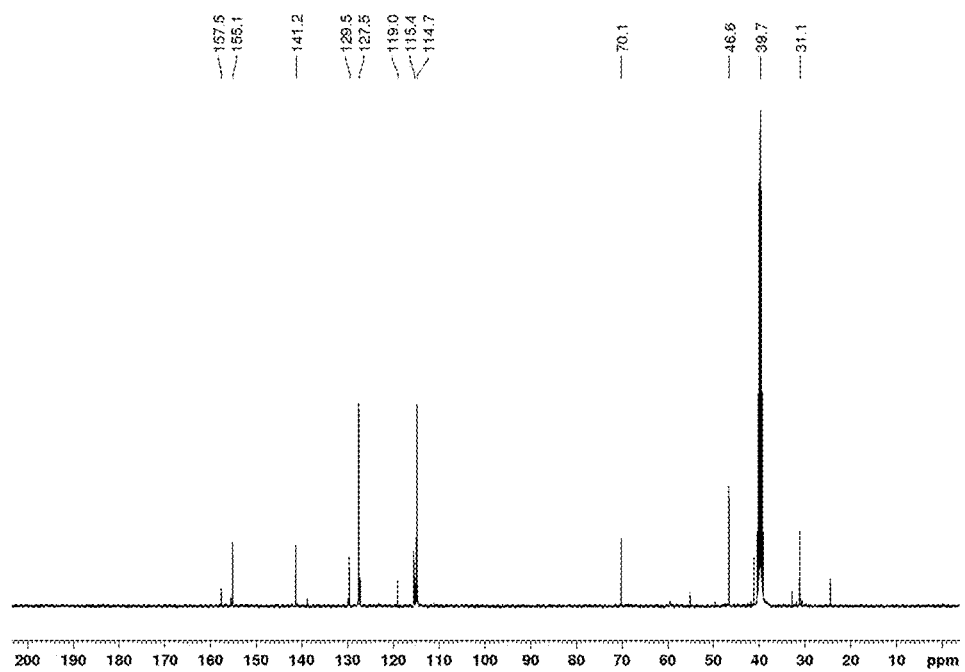

Characterization was by $^1$H-NMR (FIG. 9) and $^{13}$C-NMR (FIG. 10).

4) Treatment of BPA with Boron Trichloride.

In sample 3 and in some other experiments we observed the formation of phenol. It was important to detect, whether phenol was formed by retro Friedel-Crafts reaction of BPA or whether it arises directly from the epoxy resin upon treatment with BCl$_3$.

To a suspension of 1.00 g BPA (4.38 mmol) in 10 mL of dry DCM in a 100 mL glass pressure vessel 30 mL of a 1M solution of BCl$_3$ (3.52 g, 30.00 mmol) in dry DCM were added. The reaction mixture was stirred for 24 h at room temperature, then for 40 h at 55–60° C. After cooling to room temperature a TLC test (petrol ether/ethyl acetate 2:1) showed unreacted BPA, only, no formation of phenol was observed. This confirmed that phenol was formed directly from the epoxy resin.

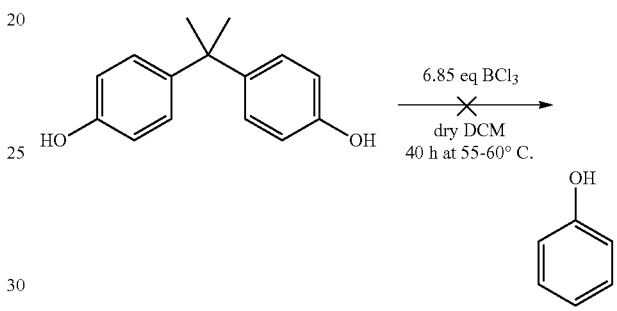

5) Recycling of DE104 (Glass Fiber Reinforced Epoxy Composite with Flame-Retardant Tetrabromobisphenol A) with BCl$_3$.

To six pieces of composite DE104 (each ca. 18×10×1.5 mm, total weight 3.02 g, ca. 1.20 g polymer, content 40% in composite DE104) in 10 mL of dry DCM in a 100 mL glass pressure vessel 10 mL of a 1M solution of BCl$_3$ (1.17 g, 10.00 mmol) in dry DCM were added. The reaction mixture was stirred for 24 h at room temperature, then for 64 h at 50–55° C. Work-up was carried out similarly to sample 3 with an additional column chromatography using a mixture of petrol ether/ethyl acetate 10:1 for the fractions 1-3, then pure acetone for fraction 4. After evaporation of the solvent in vacuum the four separate fractions VZ-DE-1-1 to VZ-DE-1-4 weighing 370 mg (VZ-DE-1-1, 1,3-dichloropropan-2-ol and a mixture of bisphenol derivatives), 280 mg (VZ-DE-1-2, BPA, TBBA and small impurities of 1,3-dichloropropan-2-ol), 40 mg VZ-DE-1-3 (oligomers and polymers), and 270 mg (VZ-DE-1-4, oligomers and polymers), respectively, were obtained. The structures of the compounds obtained were identical with the original $^1$H- and $^{13}$C-NMR spectra. The conversion rate of the organic part of the starting material (FIGS. 12 to 15) was 80% (370+280+40+270=960/1200). The amount of the glass fiber after washing with methanol, water, acetone and drying in vacuum was 1670 mg.

6) Recycling of Recyclate MPM (Glass Fiber Reinforced Epoxy Composite with Flame-Retardant Tetrabromobisphenol a from Circuit Boards) with BCl$_3$.

Figure 16:
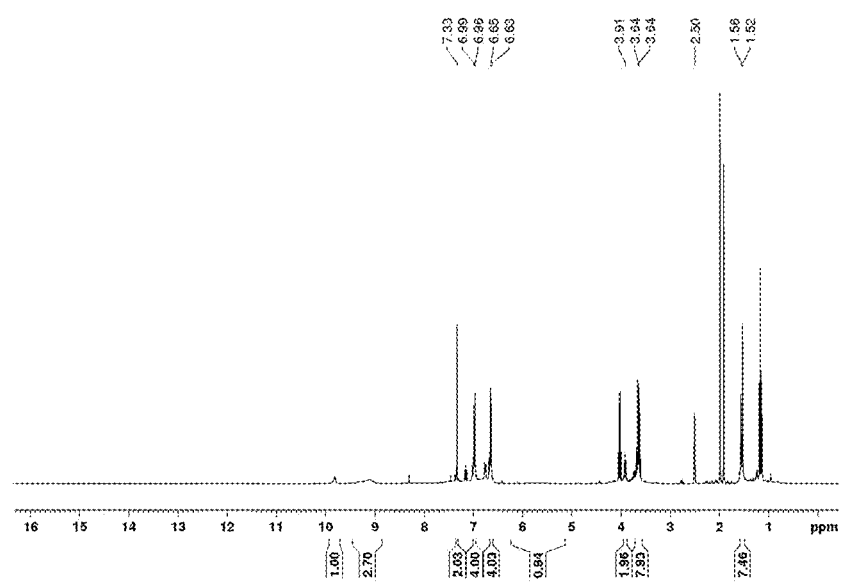
Figure 17:
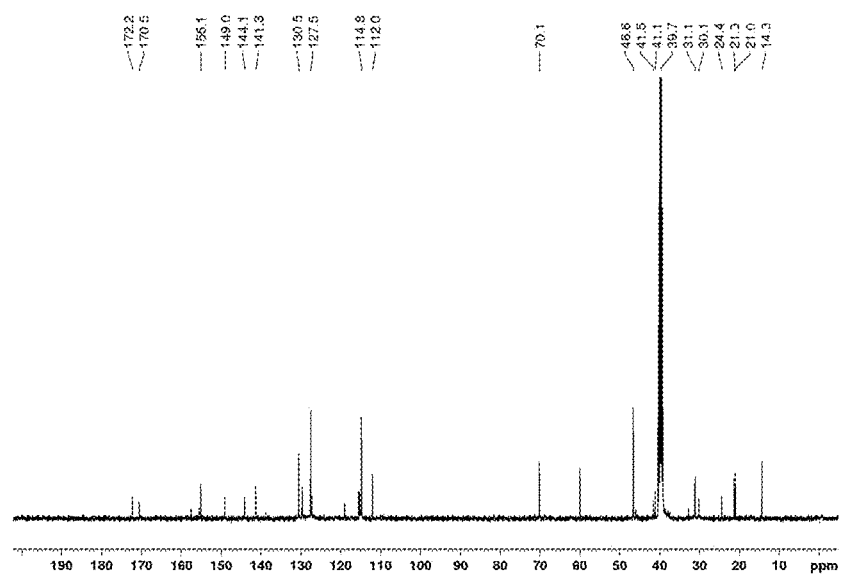

To a suspension of 1.50 g recyclate MPM powder in 5 mL of dry DCM in a 100 mL glass pressure vessel were added 10.7 mL of a 1M solution of BCl$_3$ (1.25 g, 10.70 mmol) in dry DCM. The reaction mixture was stirred for 24 h at room temperature, then at 55-60° C. for 70 h. Work-up was carried out similarly to sample 3. After evaporation of the solvent in vacuum 580 mg of product VZ-MPM-C3 were obtained as a dark viscous oil. According to the $^1$H- and $^{13}$C-MR spectra product VZ-MPM-C3 (FIGS. 16 and 17) was a mixture of BPA, TBBA and 1,3-dichloropropan-2-ol (relation 1:0.5:2, respectively). Small amounts of phenol and high molecular compounds were present, too. The weight of the glass fiber after washing with methanol, water, acetone and drying in vacuum was 670 mg.

7) Recycling of Recyclate MPM (Glass Fiber Reinforced Epoxy Composite with Flame-Retardant Tetrabromobisphenol from Circuit Boards) with BBr$_3$.

Figure 18:
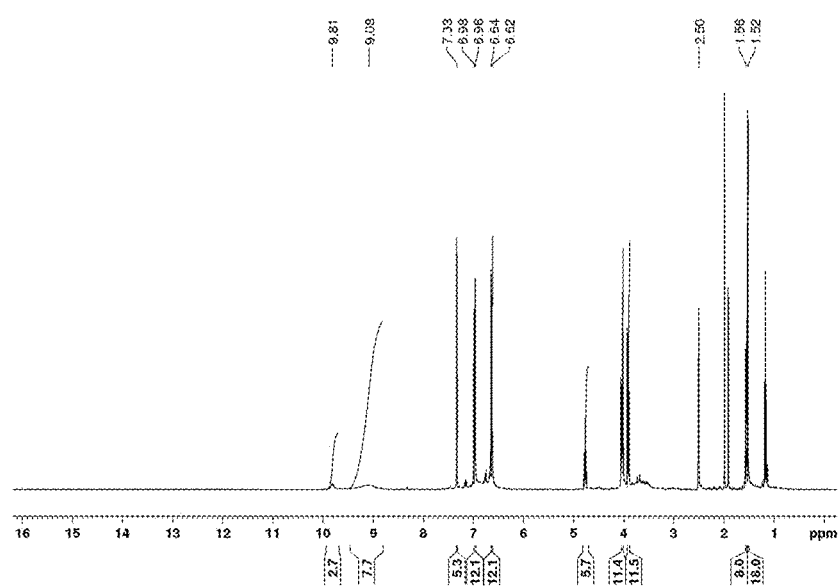
Figure 19:
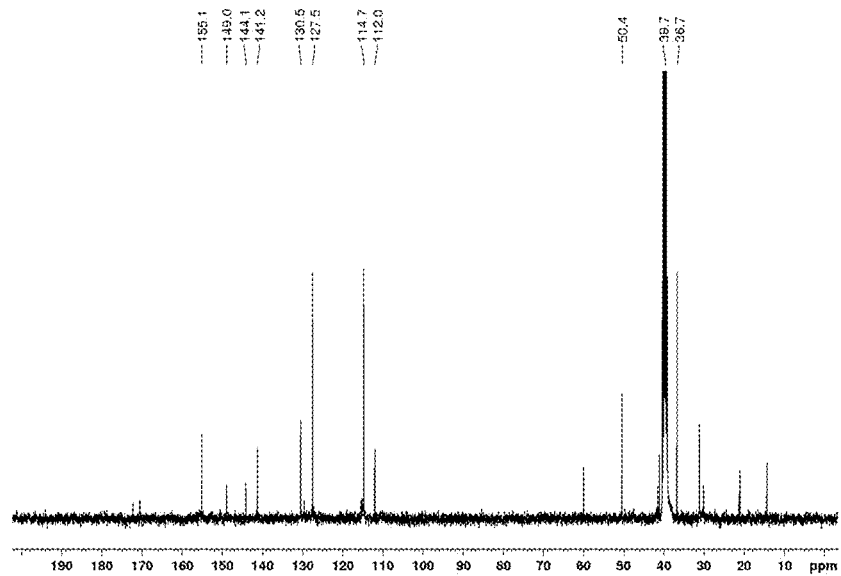
Figure 20:
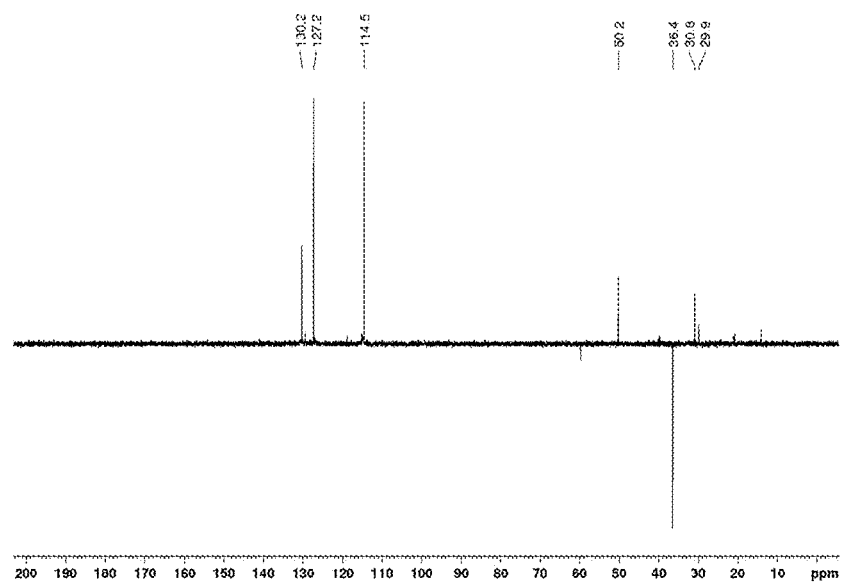

To a suspension of 1.50 g recyclate MPM powder in 20 mL of dry DCM in a 100 mL glass pressure vessel 1.02 mL (2.68 g, 10.70 mmol) of BBr$_3$ were added, and the reaction mixture was stirred for 1 d at room temperature, then at 50-55° C. for 1 h. After cooling to room temperature the reaction mixture was poured into 200 mL of ice water and extracted with ethyl acetate (3×50 mL). The organic layer was dried with sodium sulfate. Solvent removal in vacuum afforded 590 mg of product VZ-MPM-BBr-2 as a dark viscous oil. According to the $^1$H- and $^{13}$C-NMR spectra product VZ-MPM-BBr-2 (FIGS. 18 to 20) was a mixture of BPA, TBBA and 1,2,3-tribromopropane (relation 1: 0.44: 1.88, respectively). The weight of the glass fiber after washing with methanol, water, acetone and drying in vacuum was 640 mg.

8) Recycling of a Carbon Fiber Reinforced Epoxy Composite (CRP from a Wind Turbine with 70% Content of Carbon Fiber) with BBr$_3$.

Figure 21:
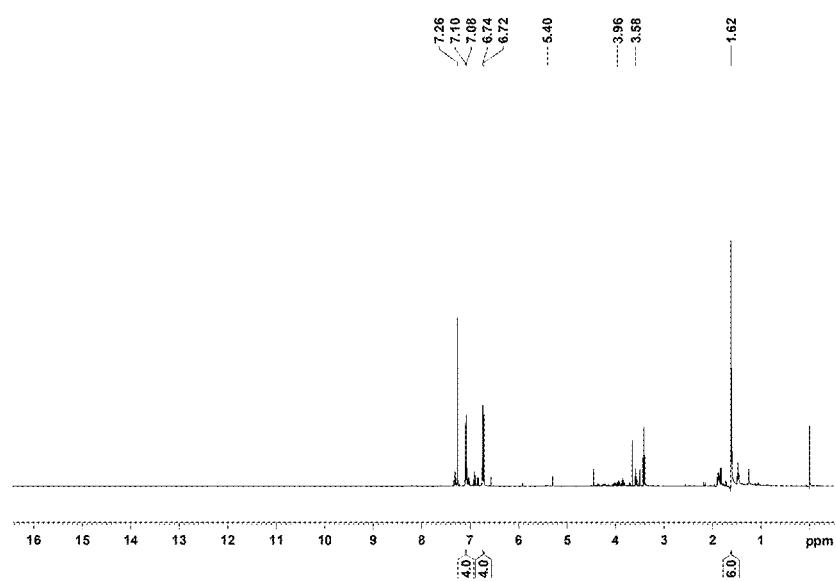
Figure 22:
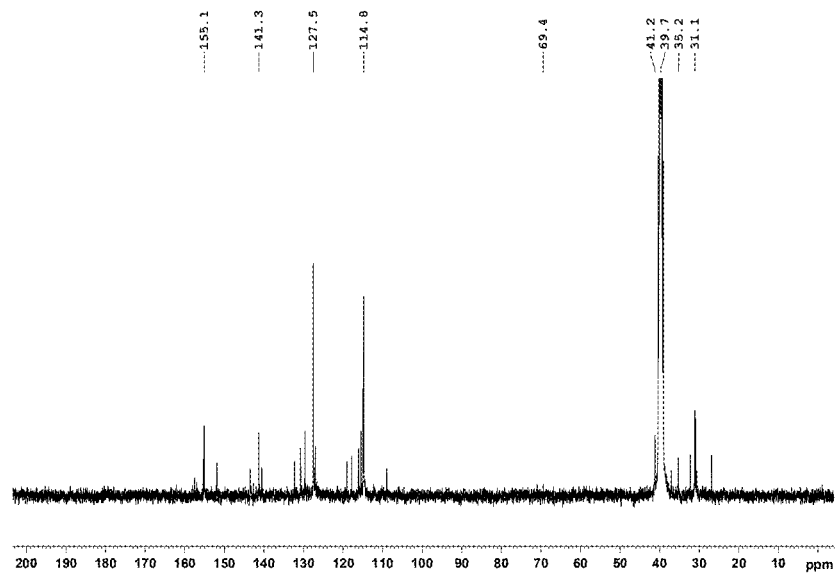
Figure 23:
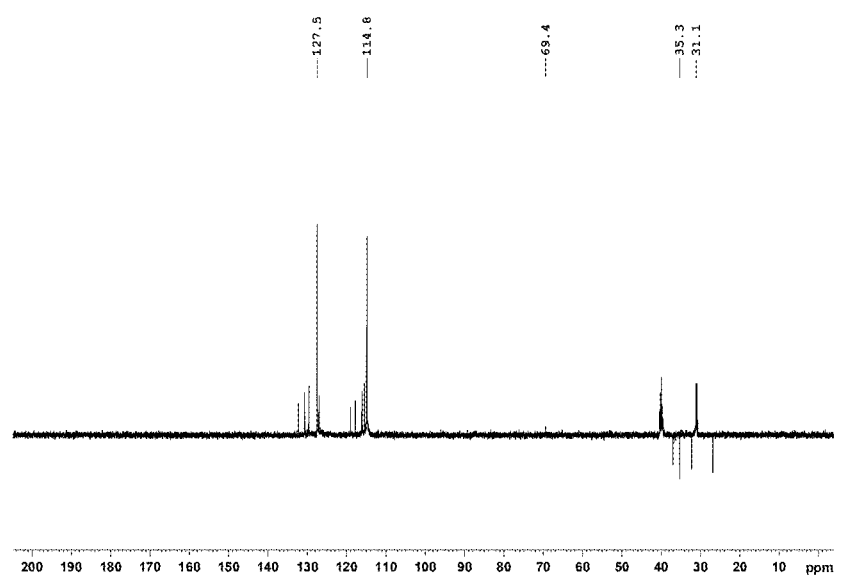

To a piece of a CRP (0.730 g, 20×10×2 mm) in a 25 mL round bottom glass Schlenk flask to mL of dry DCM and 0.25 mL (0.67 g, 2.67 mmol) BBr$_3$ were added. The reaction mixture was stirred under nitrogen for 4 d at room temperature. After cooling to −10° C., the reaction mixture was poured into too mL of ice water and extracted with ethyl acetate (3×50 mL). The organic layer was dried with sodium sulfate. Removal of the solvent in vacuum afforded 180 mg of product VZ-CFK-1 as a dark viscous oil. According to the $^1$H- and $^{13}$C-NMR spectra (FIGS. 21 to 23) product VZ-CFK-1 was a mixture of BPA, 1,3-dibromopropan-2-ol and small impurities of undefined compounds. The weight of the carbon fiber after washing with methanol, water, acetone and drying in vacuum was 511 mg.

9) Recycling of a Carbon Fiber Reinforced Epoxy Composite (CRP from a Wind Turbine with 70% Content of Carbon Fiber) with BCl$_3$.

To four pieces of a CRP (each ca. 25×2×2 mm, total weight 0.800 g) in a too mL glass pressure vessel 10.7 mL of a 1M solution of BCl$_3$ (1.25 g, 10.70 mmol) in dry DCM were added. The reaction mixture was stirred for 24 h at room temperature, then for 70 h at 60–65° C. After cooling to −10° C., the reaction mixture was poured into 200 mL of ice water and extracted with ethyl acetate (3×50 mL). The organic layer was dried with sodium sulfate. Solvent removal in vacuum afforded 190 mg of product VZ-CFK-V3 as a dark solid. According to the $^1$H-NMR spectrum (FIG. 24) product VZ-CFK-V3 was a mixture of BPA and polymer. The weight of the carbon fiber after washing with methanol, water, acetone and drying in vacuum was 515 mg.

REFERENCES

[1] M. Motavalli; C. Czaderski; A. Schumacher; D. Gsell. Textiles, Polymers and Composites for Buildings. 4—Fibre Reinforced Polymer Composite Materials for Building and Construction. Woodhead Publishing Series in Textiles, 2010, 69-128.

[2] C. E. Bakis; Lawrence C. Bank; V. L. Brown, M.; E. Cosenza; J. F. Davalos; J. J. Lesko; A. Machida; S. H. Rizkalla; and T. C. Triantafillou. Fiber-Reinforced Polymer Composites for Construction, *J. Composites for Construction*, 2002, 6(2), doi.org/10.1061/(ASCE) 1090-0268 (2002)6:2(73).

[3] Liang, B.; Qin, B.; Pastine, S.; Li, X. Reinforced Composite and Method for Recycling the Same, US 20140221510 A1, 2014.

[4] Adam, G. A. Recycling Carbon Fibers from Epoxy Using Solvent Cracking. U.S. Pat. No. 8,920,932, 2014.

[5] Asmatulu, E.; Twomey, J.; Overcash, M. Recycling of Fiber-Reinforced Composites and Direct Structural Composite Recycling Concept. *J. Composite Materials*, 2014, 48 (5), 593-608.

[6] Taynton P.; Ni H.; Zhu C.; Loob S.; Jin Y.; Zhang W.; Qi H. J. Repairable Woven Carbon Fiber Composites with Full Recyclability Enabled by Malleable Polyimine Networks. *Advanced materials* (Deerfield Beach, Fla.), 2016, 28(15), 2904-9.

[7] Kaneko, M.; Usami, K.; Ishimoto, T. Prepregs and Fiber-Reinforced Composites Therefrom. Jpn. Kokai Tokkyo Koho, 2010, JP 2010241845.

[8] Y. Wang, X. Cui, H. Ge, Y. Yang, Y. Wang, C. Zhang, J. Li, T. Deng, Z. Qin, X. Hou. Chemical Recycling of Carbon Fiber Reinforced Epoxy Resin Composites via Selective Cleavage of the Carbon-Nitrogen Bond. *ACS Sustainable Chem. Eng.* 2015, 3, 3332-3337.

[9] M. Das, R. Chacko, S. Varughese. An Efficient Method of Recycling of CFRP Waste Using Peracetic Acid. *ACS Sustainable Chem. Eng.* 2018, 6(2), 1564-1571, DOI: 10.1021/acssuschemeng.7b01456.

[10] K. Yu, Q. Shi, M. L. Dunn, T. Wang, H. J. Qi. Carbon Fiber Reinforced Thermoset Composite with Near 100% Recyclability. *Adv. Funct. Mater.* 2016, 26, 6098-6106.

[11] W. Guo, S. Bai, Y. Ye and L. Zhu. Recycling carbon fiber-reinforced polymers by pyrolysis and reused to prepare short-cut fiber C/C composite. Journal of Reinforced Plastics & Composites. 2019 0(0) 1-9.

[12] K. Kim, J. Jeong, K. An, B. Kim. A Low Energy Recycling Technique of Carbon Fibers-Reinforced Epoxy Matrix Composites. Ind. Eng. Chem. Res. 2019, 58, 618-624.

[13] M. Limburg, J. Stockschläder, P. Quicker. Thermal treatment of carbon fiber reinforced polymers (Part 1: Recycling). Waste Management & Research 2019, Vol. 37(1) Supplement 73-82.

[14] Y. Liu, M. Farnsworth, A. Tiwari. A review of optimisation techniques used in the composite recycling area: State-of-the-art and steps towards a research agenda. Journal of Cleaner Production 140 (2017) 1775-1781.

[15] M. Overcash, J. Twomey, E. Asmatulu, E. Vozzola, E. Griffing. Thermoset composite recycling—Driving forces, development, and evolution of new opportunities. Journal of Composite Materials. 2018, Vol. 52(8) 1033-1043.

[16] J. Wellekotter, S. Baz, J. Schwingel, G. Gresser, P. Middendorf, C. Bonten. Recycling of composites—A new approach minimizes downgrading. AIP Conference Proceedings 2055, 060009 (2019).

[17] WO2017/106243 A1.

[18] K. Pender and L. Yang. Investigation of Catalyzed Thermal Recycling for Glass Fiber-Reinforced Epoxy Using Fluidized Bed Process. Polymer Composites 2019 1-10.

[19] WO2017/175100 A1.

[20] WO2018/206788 A1.

[21] P. Dohlert, J. Pfrommer, S. Enthaler. Recycling Concept for End-of-Life Silicones: Boron Trifluoride Diethyl Etherate as Depolymerization Reagent to Produce Difluorodimethylsilane as Useful Commodity. *ACS Sustainable Chem. Eng.* 2015, 3, 163-169.

[22] N. M. R. Chipa; V. P. Jatakiya; P. A. Gediya; S. M. Patel, and D. J. Sen. Green Chemistry: an Unique Relationship Between Waste and Recycling, *Int. J. Adv. Pharm. Res.*, 2013, 4(7), 2000-2008.

[23] Li, F. Xia, J.; Xiong, Y.; Tang, X.; Cheng, Y. Process for Preparation of Epichlorohydrin and Dichloropropanol Intermediates, *Faming Zhuanli Shenging*, 101195607, 2008.

[24] Al-Juaid, S. S.; Eaborn, C.; El-Kheli, M. N. A.; Hitchcock, P. B.; Lickiss, P. D.; Molla, M. E.; Smith, J. D.; Zora, J. A. Tris(trimethylsilyl)methyl and Tris(dimethylphenylsilyl)methyl Derivatives of Boron. Crystal Structures of Dihydroxy[tris(trimethylsilyl)methyl]borane and of the Lithium-Boron Complex [(MeOH)2Li(μ-OMe)2B(OMe)2]. *J. Chem. Soc., Dalton Trans.: Inorganic Chem.*, 1989, 3, 447-52

[25] Bayo-Bangoura, M.; Bayo, K.; Mossoyan-Deneux, M. Synthèse de la Chlorosousphthalocyanine de Bore a Partir de L'acide 1,4-Diboronique Benzène. *Comptes Rendus Chimie* 2011, 14(6), 530-533.

[26] Ishihara, K.; Kondo, S.; Yamamoto, H. Scope and Limitations of Chiral B-[3,5-Bis(trifluoromethyl)phenyl] oxazaborolidine Catalyst for Use in the Mukaiyama Aldol Reaction. *J. Org. Chem.*, 2000, 65(26), 9125-9128.

The features disclosed in the foregoing description and in the dependent claims may, both separately and in any combination thereof, be material for realizing the aspects of the disclosure made in the independent claims, in diverse forms thereof.

| Name and description of used materials | |
|---|---|
| Compounds/ materials name | Description/Composition/Mixture |
| G10 | bromine-free glass fiber reinforced epoxy composite |
| DE104 | glass fiber reinforced epoxy composite with flame-retardant tetrabromobisphenol A |
| recyclate MPM | glass fiber reinforced epoxy composite with flame-retardant tetrabromobisphenol A from circuit boards |
| CRP | carbon fiber reinforced epoxy composite from a wind turbine with 70% content of carbon fiber |
| BPA | bisphenol A, 4,4'-(propane-2,2-diyl)diphenol |
| VZ-BPA | a BPA-sample for NMR spectra |
| TBBA | tetrabromobisphenol A, 4,4'-(propane-2,2-diyl)bis(2,6-dibromophenol) |
| VZ2628-1 | a sample of BPA dimethyl ether for NMR spectra |
| VZ2565 | a sample of TBBA diethyl ether for NMR spectra |
| VZ-G10-4-1 | a mixture of BPA, phenol and 1,3-dichloropropan-2-ol (relation 1.00:0.50:1.12, respectively) from cleavage of G10 with BCl3 |
| VZ-G10-4-2 | a mixture of oligomers with small amounts of BPA and phenol from cleavage of G10 with BCl3 |
| VZ-DE-1-1 | 1,3-dichloropropan-2-ol and a mixture of bisphenol derivatives (first fraction after treatment of DE104 with BCl$_3$) |
| VZ-DE-1-2 | BPA, TBBA and small impurities of 1,3-dichloropropan-2-ol (second fraction after treatment of DE104 with BCl$_3$) |
| VZ-DE-1-3 | oligomers and polymers (third fraction after treatment of DE104 with BCl$_3$) |
| VZ-DE-1-4 | oligomers and polymers (fourth fraction after treatment of DE104 with BCl$_3$) |
| VZ-MPM-C3 | a mixture of BPA, TBBA and 1,3-dichloropropan-2-ol (relation 1:0.5:2, respectively) from cleavage of recyclate MPM with BCl3 |
| VZ-MPM-BBr-2 | a mixture of BPA, TBBA and 1,2,3-tribromopropane (relation 1:0.44:1.88, respectively) from treatment of recyclate MPM with BBr3 |
| VZ-CFK-1 | a mixture of BPA, 1,2-dibromopropan-2-ol and small impurities of undefined compounds from treatment of CRP with BBr$_3$ |
| VZ-CFK-V3 | a mixture of BPA and polymer from treatment of CRP with BCl$_3$ |

The invention claimed is:

1. Method for recycling a composite material comprising inorganic fibers and/or organic fibers and an epoxy-resin in a one pot reaction, wherein the method comprises reacting the composite material with a boron halide in a solvent,
   wherein the boron halide is a boron trihalide, an organylboron dihalide, an organyloxyboron, dihalide or mixtures of two or more thereof, wherein the boron trihalide is selected from BCl$_3$ and BBr$_3$, and
   wherein the solvent is a hydrocarbon, a halogenated hydrocarbon, or a mixture of two or more thereof.

2. Method according to claim 1, wherein the inorganic fibers are glass fibers and/or carbon fibers.

3. Method according to claim 1, wherein the epoxy-resin comprises an alkyl aryl ether resin moiety.

4. Method according to claim 1, wherein the epoxy-resin comprises bisphenol-based monomer units and polyol-based monomer units.

5. Method according to claim 4, wherein the bisphenol-based monomer units are brominated.

6. Method according to claim 1, wherein the reacting is performed at a temperature from 0 to 150° C.

7. Method according to claim 4 wherein the bisphenol-based monomer units comprise non-brominated bisphenol-based monomer units and brominated bisphenol-based monomer units and the method comprises a further step of crystallizing to separate the non-brominated bisphenol-based monomer units and the brominated bisphenol-based monomer units from each other.

8. Method according to claim 1 further comprising a step, after the step of reacting of the composite material comprising inorganic fibers and an epoxy-resin with the boron halide, using one or more product obtained from the step of reacting to obtain a further product.

* * * * *